United States Patent
King et al.

(10) Patent No.: US 9,836,158 B2
(45) Date of Patent: Dec. 5, 2017

(54) TOUCH AND HOVER SENSOR COMPENSATION

(71) Applicant: Apple Inc., Cupertino, CA (US)

(72) Inventors: Brian Michael King, Saratoga, CA (US); Omar S. Leung, Palo Alto, CA (US); Paul G. Puskarich, Palo Alto, CA (US); Jeffrey Traer Bernstein, San Francisco, CA (US); Andrea Mucignat, San Francisco, CA (US); Avi E. Cieplinski, San Francisco, CA (US); Muhammad Umar Choudry, Mississauga (CA); Praveen R. Subramani, San Diego, CA (US); Marc J. Piche, Waterloo (CA); David Amm, Sisters, OR (US); Duncan Robert Kerr, San Francisco, CA (US)

(73) Assignee: Apple Inc., Cupertino ( * ) Notice: Subject to any disclaimer, the term of this patent is extended or adjusted under 35 U.S.C. 154(b) by 0 days.

(21) Appl. No.: 14/631,564

(22) Filed: Feb. 25, 2015

(65) Prior Publication Data
US 2015/0169114 A1 Jun. 18, 2015

Related U.S. Application Data

(62) Division of application No. 12/895,600, filed on Sep. 30, 2010, now Pat. No. 8,982,060.
(Continued)

(51) Int. Cl.
*G06F 3/044* (2006.01)
*G06F 3/041* (2006.01)

(52) U.S. Cl.
CPC ............ *G06F 3/0416* (2013.01); *G06F 3/044* (2013.01); *G06F 3/0418* (2013.01);
(Continued)

(58) Field of Classification Search
CPC .......... G06F 3/044; G06F 2203/04111; G06F 3/04886; G06F 3/045; G06F 3/041; G06F 3/04; G06F 2203/04101; G06F 3/0416
See application file for complete search history.

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

JP 2000-163031 A 6/2000
JP 2002-342033 A 11/2002
(Continued)

OTHER PUBLICATIONS

Final Office Action dated Aug. 7, 2013, for U.S. Appl. No. 12/895,600, filed Sep. 30, 2010, 19 pages.
(Continued)

*Primary Examiner* — Md Saiful A Siddiqui
(74) *Attorney, Agent, or Firm* — Morrison & Foerster, LLP

(57) ABSTRACT

Compensation for sensors in a touch and hover sensing device is disclosed. Compensation can be for sensor resistance and/or sensor sensitivity variation that can adversely affect touch and hover measurements at the sensors. To compensate for sensor resistance, the device can gang adjacent sensors together so as to reduce the overall resistance of the sensors. In addition or alternatively, the device can drive the sensors with voltages from multiple directions so as to reduce the effects of the sensors' resistance. To compensate for sensor sensitivity variation (generally at issue for hover measurements), the device can apply a gain factor to the measurements, where the gain factor is a function of the
(Continued)

sensor location, so as to reduce the sensitivity variation at different sensor locations on the device.

21 Claims, 33 Drawing Sheets

Related U.S. Application Data

(60) Provisional application No. 61/377,829, filed on Aug. 27, 2010.

(52) U.S. Cl.
CPC .............. *G06F 2203/04101* (2013.01); *G06F 2203/04106* (2013.01); *G06F 2203/04108* (2013.01); *G06F 2203/04111* (2013.01)

(56) References Cited

U.S. PATENT DOCUMENTS

| | | | |
|---|---|---|---|
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,567,240 | B2 | 7/2009 | Peterson, Jr. et al. |
| 7,653,883 | B2 | 1/2010 | Hotelling et al. |
| 7,663,607 | B2 | 2/2010 | Hotelling et al. |
| 8,479,122 | B2 | 7/2013 | Hotelling et al. |
| 8,692,795 | B1 * | 4/2014 | Kremin .................. G06F 3/044 345/173 |
| 8,982,060 | B2 | 3/2015 | King et al. |
| 2003/0132922 | A1 | 7/2003 | Philipp |
| 2006/0026521 | A1 | 2/2006 | Hotelling et al. |
| 2006/0197753 | A1 | 9/2006 | Hotelling |
| 2008/0012835 | A1 | 1/2008 | Rimon et al. |
| 2008/0093130 | A1 * | 4/2008 | Lee .................... G06F 3/04886 178/18.01 |
| 2008/0158172 | A1 | 7/2008 | Hotelling et al. |
| 2008/0192024 | A1 * | 8/2008 | Mita ........................ G06F 3/044 345/173 |
| 2008/0246723 | A1 | 10/2008 | Baumbach |
| 2008/0309631 | A1 | 12/2008 | Westerman et al. |
| 2009/0309851 | A1 | 12/2009 | Bernstein |
| 2010/0156805 | A1 | 6/2010 | Brand |
| 2010/0321328 | A1 * | 12/2010 | Chang .................. G06F 3/0416 345/174 |
| 2011/0012853 | A1 | 1/2011 | Chang et al. |
| 2011/0050635 | A1 * | 3/2011 | Nien ........................ G06F 3/044 345/174 |
| 2011/0187675 | A1 * | 8/2011 | Nakai ..................... G06F 3/044 345/174 |
| 2012/0050209 | A1 | 3/2012 | King |
| 2013/0100071 | A1 | 4/2013 | Wright et al. |

FOREIGN PATENT DOCUMENTS

| | | | |
|---|---|---|---|
| WO | WO 2010/089980 | * | 8/2010 |
| WO | WO-2012/027087 A2 | | 3/2012 |

OTHER PUBLICATIONS

International Search Report dated Aug. 30, 2012, for PCT Application No. PCT/US2011/046818, filed Aug. 5, 2011, three pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action dated Feb. 4, 2013, for U.S. Appl. No. 12/895,600, filed Sep. 30, 2010, 15 pages.
Non-Final Office Action dated Mar. 6, 2014, for U.S. Appl. No. 12/895,600, filed Sep. 30, 2010, 17 pages.
Notice of Allowance dated Nov. 5, 2014, for U.S. Appl. No. 12/895,600, filed Sep. 30, 2010, 11 pages.
Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.
Rubine, D.H. (May 1992). "Combining Gestures and Direct Manipulation," CHI '92, pp. 659-660.
U.S. Appl. No. 12/501,382, filed Jul. 10, 2009, by Bernstein et al.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

TOUCH AND HOVER SENSOR COMPENSATION

CROSS REFERENCE TO RELATED APPLICATIONS

This application is a divisional of application Ser. No. 12,895,600, filed Sep. 30, 2010, which claims the benefit of U.S. Provisional Application No. 61/377,829, filed Aug. 27, 2010, the contents of which are incorporated by reference herein in their entirety for all purposes.

FIELD

This relates generally to touch and hover sensing and more particularly to devices that can perform both touch and hover sensing.

BACKGROUND

Touch sensitive devices have become quite popular as input devices to computing systems because of their ease and versatility of operation as well as their declining price. A touch sensitive device can include a touch sensor panel, which can be a clear panel with a touch sensitive surface, and a display device such as a liquid crystal display (LCD) that can be positioned partially or fully behind the panel or integrated with the panel so that the touch sensitive surface can cover at least a portion of the viewable area of the display device. The touch sensitive device can allow a user to perform various functions by touching the touch sensor panel using a finger, stylus or other object at a location often dictated by a user interface (UI) being displayed by the display device. In general, the touch sensitive device can recognize a touch event and the position of the touch event on the touch sensor panel, and the computing system can then interpret the touch event in accordance with the display appearing at the time of the touch event, and thereafter can perform one or more actions based on the touch event.

Some touch sensitive devices can also recognize a hover event, i.e., an object near but not touching the touch sensor panel, and the position of the hover event at the panel. The touch sensitive device can then process the hover event in a manner similar to that for a touch event, where the computing system can interpret the hover event in according with the display appearing at the time of the hover event, and thereafter can perform one or more actions based on the hover event.

While touch and hover capabilities in a touch sensitive device are desirable, together they can present a challenge to cooperative performance for accurate, reliable detection of touch and hover events.

SUMMARY

This relates to compensation for sensors in a touch and hover sensing device. Compensation can be for sensor resistance and/or sensor sensitivity variation that can adversely affect touch and hover measurements at the sensors. To compensate for sensor resistance, the device can gang adjacent sensors together so as to reduce the overall resistance of the sensors. In addition or alternatively, the device can drive the sensors with voltages from multiple directions so as to reduce the effects of the sensors' resistance. To compensate for sensor sensitivity variation (generally at issue for hover measurements), the device can apply a gain factor to the measurements, where the gain factor is a function of the sensor location, so as to reduce the sensitivity variation at different sensor locations on the device. Sensor compensation can advantageously provide improved touch and hover sensing.

DETAILED DESCRIPTION

In the following description of various embodiments, reference is made to the accompanying drawings which form a part hereof, and in which it is shown by way of illustration specific embodiments which can be practiced. It is to be understood that other embodiments can be used and structural changes can be made without departing from the scope of the various embodiments.

This relates to improved touch and hover sensing. Various aspects of touch and hover sensing can be addressed to improve detection of touch and hover events. In some embodiments, a touch and hover sensing device can ensure that a desired hover event is not masked by an incidental touch event, e.g., a hand holding the device, by compensating for the touch event in the sensing signal that represents both events. Conversely, in some embodiments, when both the hover and touch events are desired, the device can make adjustments to its sensors and/or the sensing signal to ensure that both events are detected. In some embodiments, the device can improve the accuracy of its determination of the device user interface location to which a hovering object is pointing by profiling the object shape. In some embodiments, the device can differentiate between object distance and area (or size) so as to properly process the corresponding sensing signal and subsequently perform the intended actions. In some embodiments, the device can improve detection of concurrent hover events. In some embodiments, the device can compensate for signal drift in the sensing signal by adjusting the baseline capacitance of the device. In some embodiments, the device can compensate for resistance from the touch and hover sensors by making adjustments to the sensors and/or the voltage patterns driving the device. In some embodiments, the device can compensate the sensing signal for sensitivity variations of the sensors (generally at issue during a hover event), by applying a gain factor as a function of the location of the hover event to the sensing signal. In some embodiments, the device can improve sensor switching between a touch mode and a hover mode by compensating for parasitic capacitance introduced by the switching components in the sensing signal. In some embodiments, the device can improve integration of a display with the sensors by reducing interference from the display at the sensors.

These and other approaches can advantageously provide improved touch and hover sensing.

Figure 1:
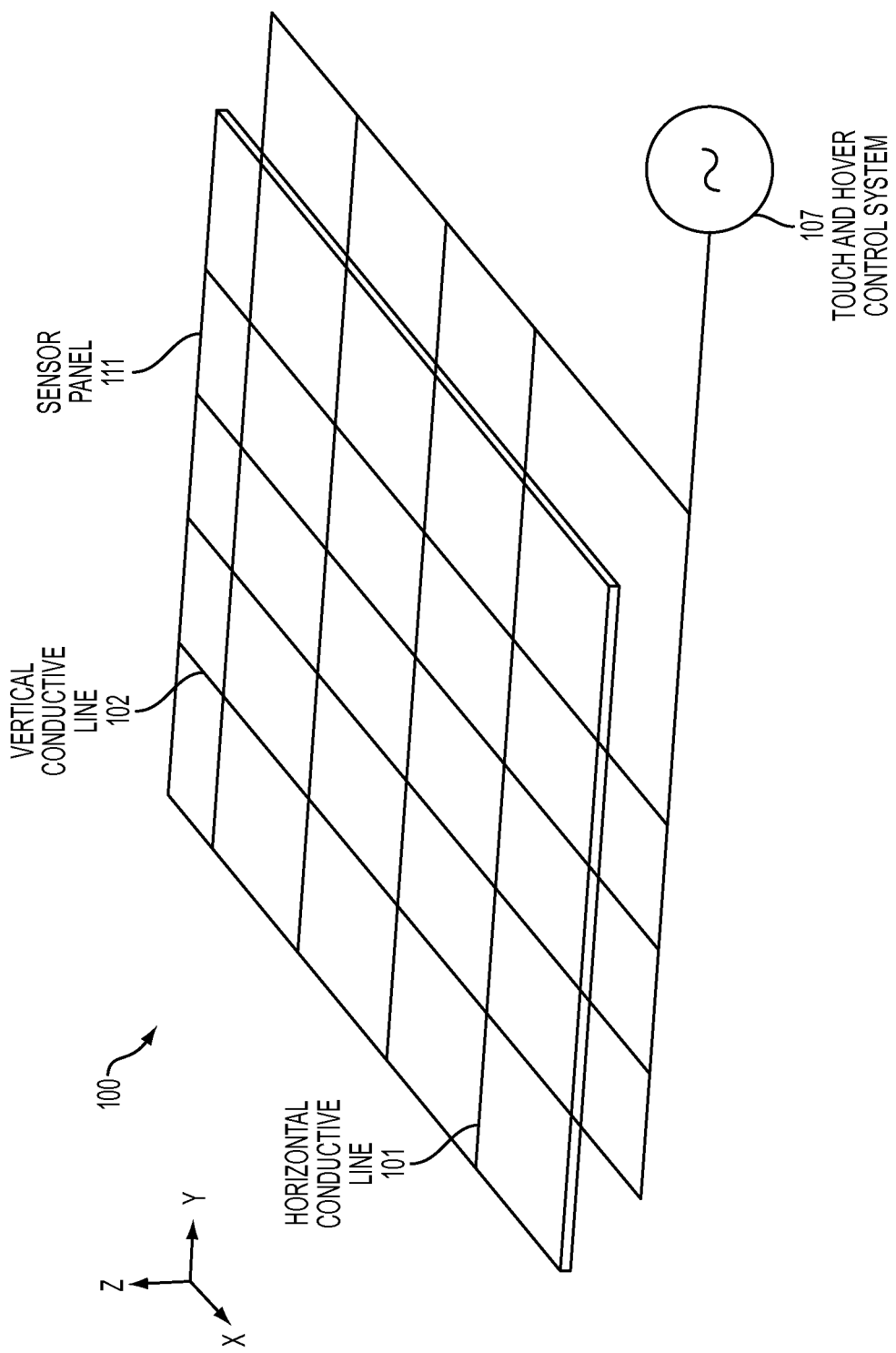
FIG. 1 illustrates an exemplary touch and hover sensing device according to various embodiments.

FIG. 1 illustrates an exemplary touch and hover sensing device according to various embodiments. In the example of FIG. 1, which is drawn symbolically, touch and hover sensing device 100 can include sensor panel 111 having an array of horizontal lines 101 and vertical lines 102 that can cross over each other to form sensors for sensing a touching object and/or a hovering object. Alternatively, the horizontal lines 101 and the vertical lines 102 can be arranged near each other on the same layer without making direct electrical contact to form the sensors. Other non-orthogonal arrangements of the lines 101, 102 can also be employed based on the needs of the device 100. The horizontal lines 101 and the vertical lines 102 can be electrically conductive traces of conductive material, e.g., indium-tin-oxide (ITO). The conductive material can be transparent, semi-transparent, or opaque depending on the needs of the device 100. The touch and sensing device 100 can also include touch and hover control system 107 that can drive the sensor panel 111 with electrical signals, e.g., AC signals, applied to the horizontal lines 101 and/or the vertical lines 102. The AC signals transmitted to the sensor panel 111 can create electric fields extending from the sensor panel, which can be used to sense objects hovering over or touching on the panel. The touch and hover control system 107 can then measure the change in capacitance caused by the hovering or touching objects on the horizontal lines 101 and/or the vertical lines 102 to detect a hover event or a touch event at the sensor panel 111.

The touch and hover sensing device 100 can operate based on self capacitance and/or mutual capacitance. In self capacitance, the self capacitance of the sensor panel 111 can be measured relative to some reference, e.g., ground. An object placed in the electric field near the sensor panel 111 can cause a change in the self capacitance of the sensor panel, which can be measured by various techniques. For example, the touch and hover control system 107 can drive each horizontal line 101 and vertical line 102 to create an electric field extending from the sensor panel 111. The touch and hover control system 107 can then measure the self capacitance on each horizontal line 101 and vertical line 102, where the strongest measurements, e.g., the greatest changes in self capacitance, on the horizontal lines and the vertical lines can indicate the (x,y) location of a hover event or a touch event.

In mutual capacitance, the mutual capacitance of the sensor panel 111 can be formed between the crossing or proximate horizontal and vertical lines 101, 102. An object placed in the electric field near the sensor panel 111 can cause a change in the mutual capacitance of the sensor panel, which can be measured by various techniques. For example, the touch and hover control system 107 can drive each horizontal line 101 to create an electric field extending from the sensor panel 111. The touch and hover control system 107 can then measure the change in mutual capacitance on the vertical lines 102, where the strongest measurements, e.g., the greatest changes in mutual capacitance, at the crossings or proximate locations of the horizontal and vertical lines can indicate the (x,y) location of a hover event or a touch event.

In some embodiments, the touch and hover sensing device 100 can use self capacitance to detect a hover event and mutual capacitance to detect a touch event. In other embodiments, the device 100 can use self capacitance to detect all events. In still other embodiments, the device can use mutual capacitance to detect all events. Various capacitance configurations can be used according to the needs of the device.

As described herein, in some embodiments, a capacitance measurement can indicate an absolute capacitance and, in some embodiments, a capacitance measurement can indicate a change in capacitance.

Below are various aspects of touch and hover sensing that can be addressed to provide improved detection of touch and hover events according to various embodiments.

Touch Signal Compensation

Figure 2:
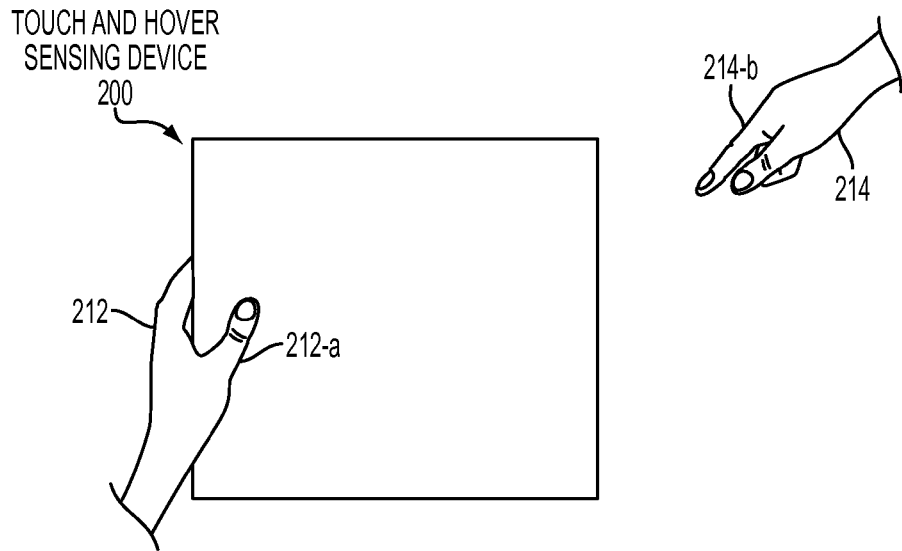
FIG. 2 illustrates an exemplary touch and hover sensing device sensing a touch proximate thereto that can be compensated for according to various embodiments.

An object touching a sensing device can generally produce a stronger signal than an object hovering over the device, such that the touch signal can mask or otherwise reduce detectability of the hover signal when they occur at the same time. This can be particularly problematic when the touch signal is merely incidental and the hover signal is of interest. FIG. 2 illustrates such an example. Here, a user can grasp touch and hover sensing device 200 with left hand 212, where thumb 212-a touches the device sensing area, and at the same time hover over the device with right hand 214, where finger 214-b points to areas on the device's UI display to cause some action. Because the thumb 212-a touches the device 200, the sensors proximate to the thumb can generate a stronger signal, in some cases, a saturated signal. In contrast, because the finger 214-b hovers above the device 200, the sensors detecting the finger can generate a weaker signal, in some cases, a much weaker signal. To properly recover the weaker hover signal, the device 200 can compensate for the effects of the stronger touch signal.

Figure 3:
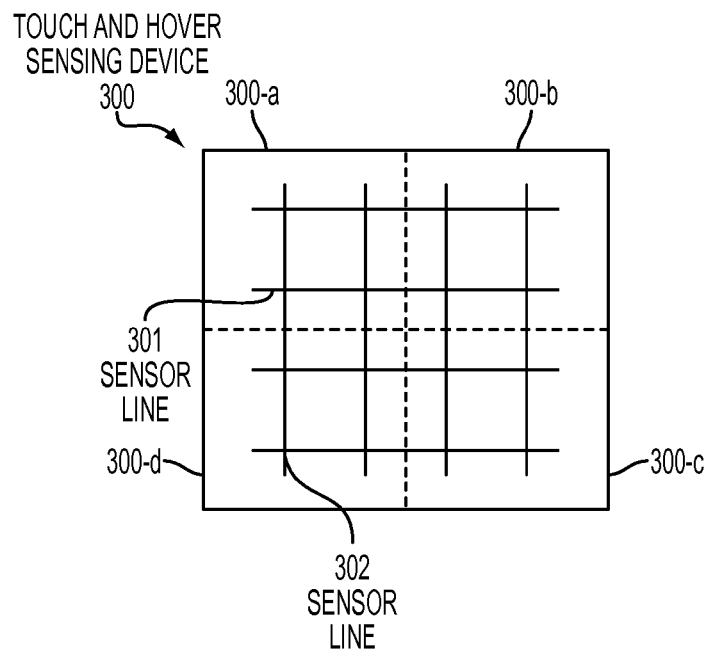
FIG. 3 illustrates an exemplary touch and hover sensing device that can compensate for a touch signal according to various embodiments.

FIG. 3 illustrates an exemplary touch and hover sensing device that can compensate for a touch signal according to various embodiments. In the example of FIG. 3, sensors formed by sensor lines 301, 302 in touch and hover sensing device 300 can be partitioned (symbolically illustrated by broken lines) into quadrants 300-a, 300-b, 300-c, and 300-d such that the sensing signals associated with the sensors in these quadrants can also be partitioned. The quadrants having stronger touch signals can be detected and separated from the quadrants having weaker hover signals, such that the weaker hover signals can be recovered for further processing and the stronger touch signals can be ignored or discarded. In some embodiments, the partitioning can be performed in software and/or firmware, where the quadrants can share sensor lines 301, 302. In some alternate embodiments, the partitioning can be done in hardware, where each quadrant can have separate sensor lines 301, 302.

Although the touch and hover sensing device of FIG. 3 is partitioned into quadrants, other numbers of partitions and/or configurations are also available provided that each partition includes at least one edge of the device for connecting the sensor lines to drive and sense circuitry.

Figure 4:
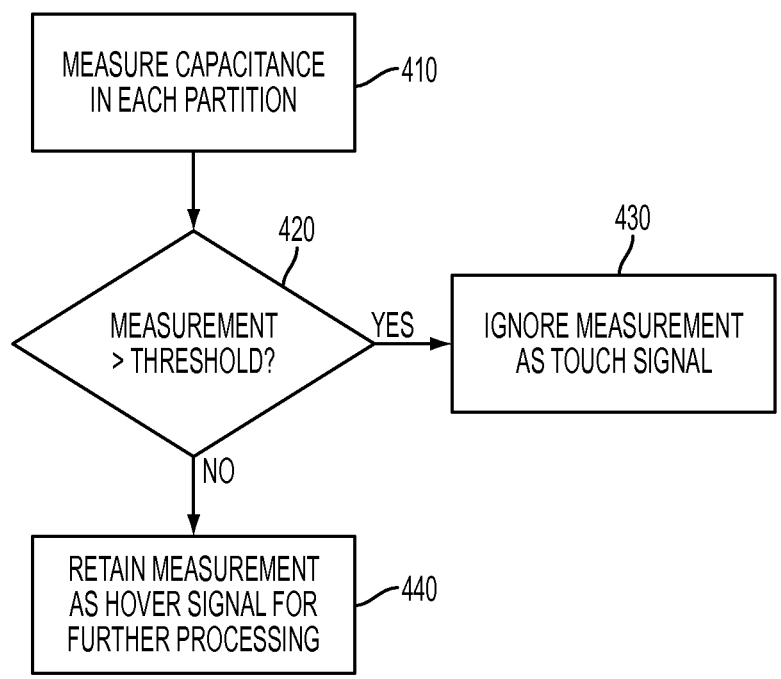
FIG. 4 illustrates an exemplary method to compensate for a touch signal in a touch and hover sensing device according to various embodiments.

FIG. 4 illustrates an exemplary method to compensate for a touch signal in the touch and hover sensing device of FIG. 3. In the example of FIG. 4, the capacitance in each partition can be measured (410). A determination can be made whether the capacitance measurement exceeds a predetermined threshold (420). If the measurement exceeds the threshold, indicative of a strong or saturated signal, then the capacitance measurement can be ignored as an incidental touch signal, e.g., a thumb holding the device (430). Otherwise, if the measurement does not exceed the threshold, indicative of a weaker signal, then the capacitance measurement can be retained for further processing as a desired hover signal, e.g., a finger hovering over the device (440).

Figure 5:
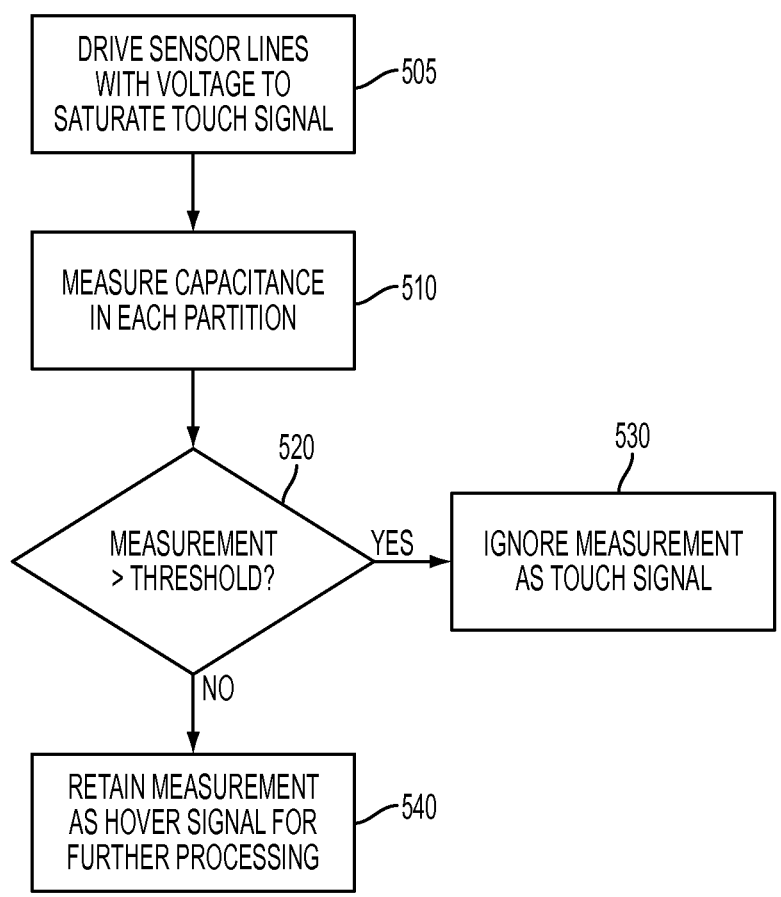
FIG. 5 illustrates another exemplary method to compensate for a touch signal in a touch and hover sensing device according to various embodiments.

FIG. 5 illustrates another exemplary method to compensate for a touch signal in the touch and hover sensing device of FIG. 3. In the example of FIG. 5, the device sensor lines can be driven with a specific voltage so as to ensure that a touch saturates the associated sensors formed by the sensor lines (505). In some embodiments, where the sensors are partitioned in software and/or firmware, the drive voltage to all the partitions can be the same. In some alternate embodiments, where the sensors are partitioned in hardware, the drive voltage in partitions in which an incidental touch is more likely to occur can be the specific voltage so as to saturate the sensors in those partitions, whereas the drive voltage in the remaining partitions can be different so as to properly sense a finger hovering over the device. The capacitance in each partition can be measured (510). A determination can be made whether the capacitance measurement exceeds a predetermined threshold (520). If so, indicative of a saturated signal, then the capacitance measurement can be ignored as an incidental touch signal (530). If not, then the capacitance measurement can be retained for further processing as a desired hover signal (540).

Figure 6:
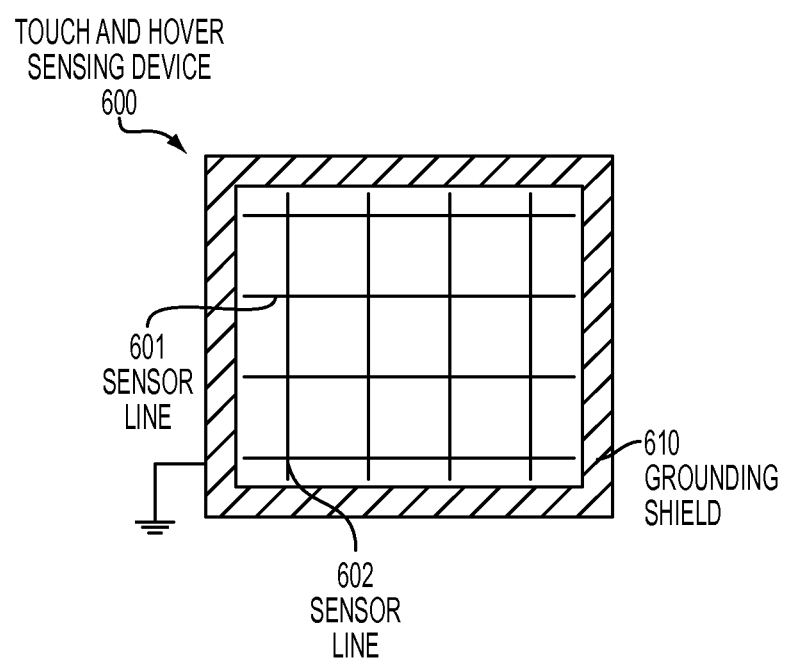
FIG. 6 illustrates another exemplary touch and hover sensing device that can compensate for a touch signal according to various embodiments.

FIG. 6 illustrates another exemplary touch and sensing device that can compensate for a touch signal according to various embodiments. In the example of FIG. 6, touch and hover sensing device 600 can include grounding shield 610 around the border of the device. In many cases, the most likely incidental touch comes from a thumb or other object grasping the device 600 at the edges. As such, the grounding shield 610 around the border can block the thumb or other object from contacting the device sensors formed by sensor lines 601, 602 and a touch signal being generated therefrom. The grounding shield 610 can be any conductive material coupled to ground to shunt any capacitance from the touching object to ground rather than into the device sensors.

Figure 7:
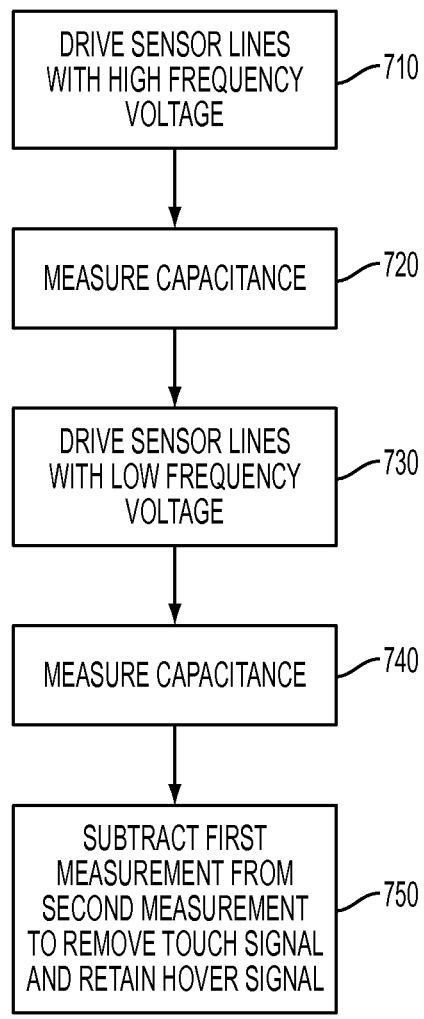
FIG. 7 illustrates another exemplary method to compensate for a touch signal in a touch and hover sensing device according to various embodiments.

In addition or alternative to partitioning the device as in FIG. 3 or providing a grounding shield as in FIG. 6, the drive voltage configuration of the device can be manipulated to compensate for a touch signal, as described in FIG. 7.

FIG. 7 illustrates an exemplary method to compensate for a touch signal in a touch and hover sensing device by adjusting the frequency of the drive voltage according to various embodiments. Due to resistance from the sensor lines' conductive material, the ability of a drive voltage to travel along a sensor line can be influenced by the drive voltage's frequency, where higher frequencies can be more adversely affected by the sensor lines' resistance than lower frequencies. As a result, at higher frequency drive voltages, the sensors at the start of the sensor lines can see stronger drive voltages than sensors at the end of the sensor lines, thereby generating stronger electric fields and subsequent stronger touch and hover signals. At lower frequency drive voltages, the sensors all along the sensor lines can be driven similarly, thereby generating acceptable electric fields and subsequent touch and hover signals everywhere. This effect of sensor resistance on drive voltage frequencies can be used to compensate for a touch signal.

In the example of FIG. 7, the sensor lines can be driven with a higher frequency drive voltage (710). The capacitance at the sensors formed by the sensor lines can be measured (720). The sensor lines can then be driven with a lower frequency drive voltage (730). The capacitance at the sensors can again be measured (740). Assuming that an incidental touch is more likely to occur at the start of the sensor lines, the higher frequency capacitance measurements and the lower frequency capacitance measurements can be substantially similar. Conversely, assuming that a desired hover is more likely to occur away from the start of the sensor lines, the higher frequency capacitance measurements and the lower frequency capacitance measurements can be substantially different, the lower frequency capacitance measurements being higher. Accordingly, the higher frequency measurements can be subtracted from the lower frequency measurements, thereby substantially eliminating the incidental touch signals and retaining the desired hover signals (750).

Figure 8:
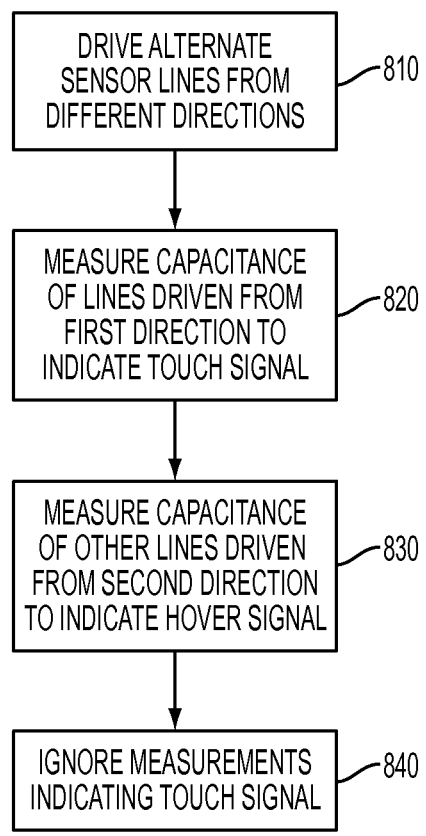
FIG. 8 illustrates another exemplary method to compensate for a touch signal in a touch and hover sensing device according to various embodiments.

FIG. 8 illustrates another exemplary method to compensate for a touch signal in a touch and hover sensing device by driving the device sensor lines from multiple directions according to various embodiments. As described above, the resistance from the sensor lines' conductive material can interfere with the drive voltages. By driving the sensor lines from different directions, the device can ensure acceptable sensing signals in aggregate. In the example of FIG. 8, horizontal sensor lines can alternate being driven from the right and the left (810). For example, the topmost horizontal sensor line can be driven from the left, the next sensor line from the right, and so on. As such, the sensors formed by the left-driven sensor lines can generate stronger signals at the left of the device, whereas the sensors formed by the right-driven sensor lines can generate stronger signals at the right of the device (based on the assumption that the drive voltages are at least somewhat adversely affected by the sensor lines' resistance). Assuming that an incidental touch is more likely to occur at the sensors on the left side of the device, the capacitance measurements for the sensors formed by the left-driven sensor lines can indicate the incidental touch signal (820). On the other hand, assuming that a desired hover is more likely to occur at the sensors on the right side of the device, the capacitance measurements for the sensors formed by the right-driven sensor lines can indicate the desired hover signal (830). Accordingly, capacitance measurements from the left-driven sensors can be ignored or discarded (840). Alternatively, the incidental touch can be more likely to occur at the sensors on the right side and the desired hover at the sensors on the left side. As such, capacitance measurements from the right-driven sensors can be ignored or discarded.

Although the examples of FIGS. 2 through 8 describe an incidental touch as more likely occurring at a side of the device, it is to be understood that other locations, e.g., the top and bottom, the center, and the like, are also possible and readily compensated for according to various embodiments.

Object Shape Profiling

Figure 9:
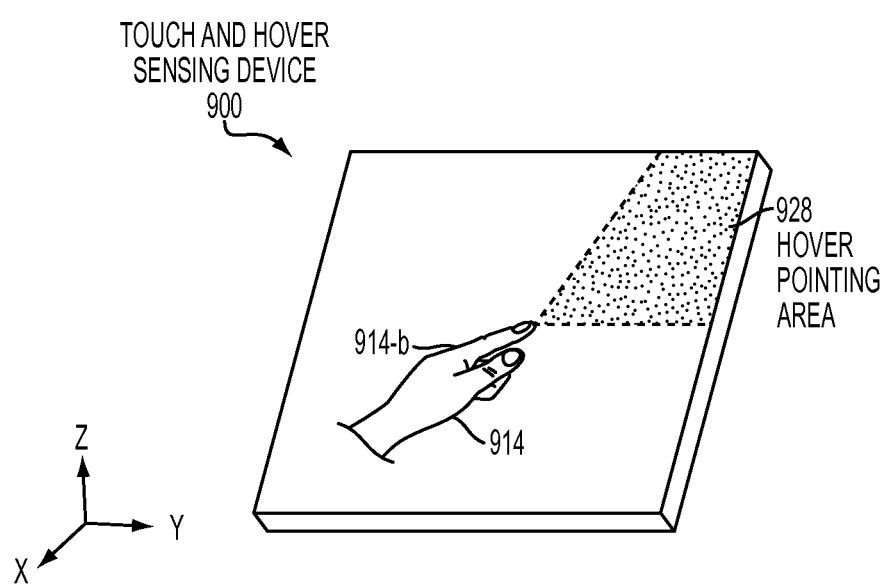
FIG. 9 illustrates an exemplary touch and hover sensing device sensing an object proximate thereto that can be shape profiled according to various embodiments.

An object hovering over a sensing device can point to an area on the device's UI display to cause an action. In some instances, there can be difficulty in determining specifically where the object is pointing so as to cause the intended action. FIG. 9 illustrates such an example. Here, finger 914-b of hand 914 can hover over touch and hover sensing device 900, where the finger is pointing somewhere in area 928 of the device UI display. To help identify where within the region 928 the finger 914-b is pointing, various methods associated with hand shape profiling can be used.

Figure 10:
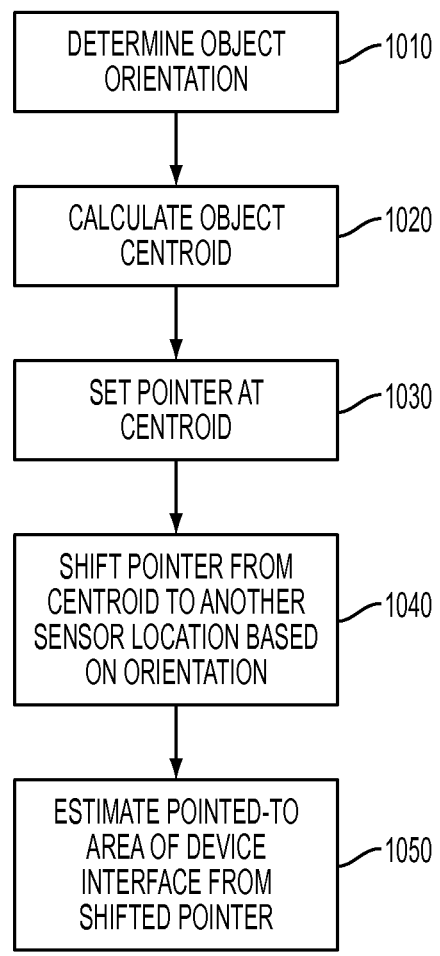
FIG. 10 illustrates an exemplary method to profile an object shape in a touch and hover sensing device according to various embodiments.

FIG. 10 illustrates an exemplary method to profile an object shape in a touch and hover sensing device according to various embodiments. In the example of FIG. 10, a determination can be made as to the orientation of a hovering object, e.g., a hand, relative to the touch and hover sensing device, such as the object oriented in an upright position toward an upper right or left corner or center of the device, the object oriented in a reversed position toward a lower right or left corner or center of the device, and so on (1010). The determination can be made by either a user inputting the object orientation or a suitable orientation algorithm calculating the orientation based on the hover signal, for example. The centroid of the object can be calculated (1020). To calculate the centroid, the sensor locations that detected the hovering object can be identified for determining the object area. The centroid of the object area and its corresponding sensor location can then be calculated using any suitable centroid detection algorithm. A pointer can be set at the centroid to indicate an initial estimate of where the object is pointing (1030). The pointer location can be shifted from the centroid location to another sensor location of the object area that is more indicative of where the object is pointing and that is according to the orientation of the object (1040). For example, if the object is oriented toward the upper right of the device UI display, the pointer location can be shifted in the upper-right direction from the sensor location corresponding to the centroid of the determined object area to the upper-right sensor location of that area. Similarly, in another example, if the object is oriented toward the top of the device UI display, the pointer location can be shifted upward from the centroid location to an uppermost sensor location of the object area. A trajectory or some other extrapolation can be made from the pointer onto the UI display to estimate the pointed-to area (1050).

In some embodiments, when the touch and hover sensing device is held in a substantially upright pose, an accelerometer or a similar detector in the device can be used to determine where to shift the pointer location (1040). For example, the accelerometer can detect the direction of gravity with respect to the device. Assuming that the object pointing to the device is right-side up and not upside down, the pointer location can be shifted from the centroid location to another sensor location in the direction opposite gravity. The shifted pointer can then be used to estimate the pointed-to area on the UI display (1050).

Figure 11:
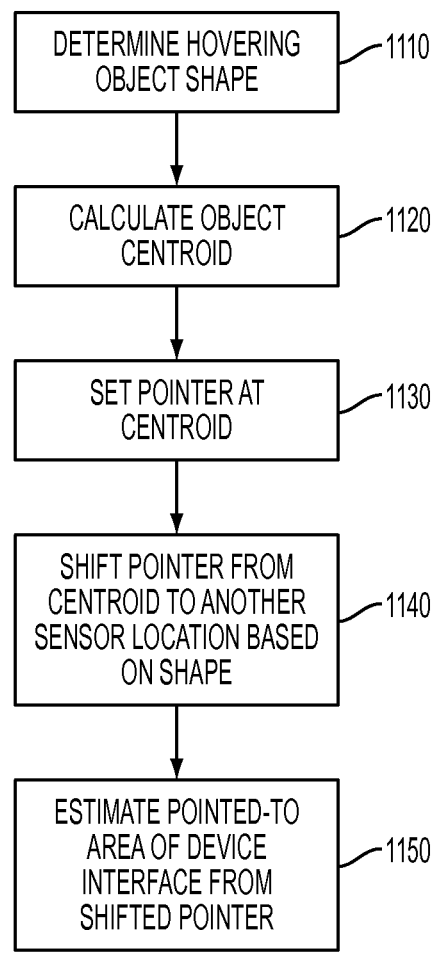
FIG. 11 illustrates another exemplary method to profile an object shape in a touch and hover sensing device according to various embodiments.

FIG. 11 illustrates another exemplary method to profile an object shape in a touch and hover sensing device according to various embodiments. In the example of FIG. 11, a shape of a hovering object, e.g., a hand, can be determined based on the hovering signal (1110). For example, the sensor locations that detected the hovering object can be used by any suitable shape identification algorithm to determine the area and hence the shape of the object. The centroid of the object can be calculated (1120). The centroid of the determined area and its corresponding sensor location can be calculated using any suitable centroid detection algorithm. A pointer can be set at the centroid to indicate an initial estimate of where the object is pointing (1130). The pointer location can be shifted from the centroid location to another sensor location of the object area that is more indicative of where the object is pointing and that is according to the shape of the object area (1140). For example, if the object shape has an extended portion toward the upper right of the device UI display, the pointer location can be shifted from the centroid to a sensor location in the upper right of the object area. A trajectory or some other extrapolation can be made from the shifted pointer onto the UI display to estimate the pointed-to area (1150).

In some embodiments, the hovering signal in the determined object area can be curve-fitted to determine the signal maximum, indicative of the portion of the object closest to the touch and hover sensing device and correspondingly where the object is pointing. Accordingly, the pointer location can be shifted from the centroid location to the sensor location corresponding to the signal maximum (1140). The shifted pointer can then be used to estimate the pointed-to area on the UI display (1150).

Figure 12:
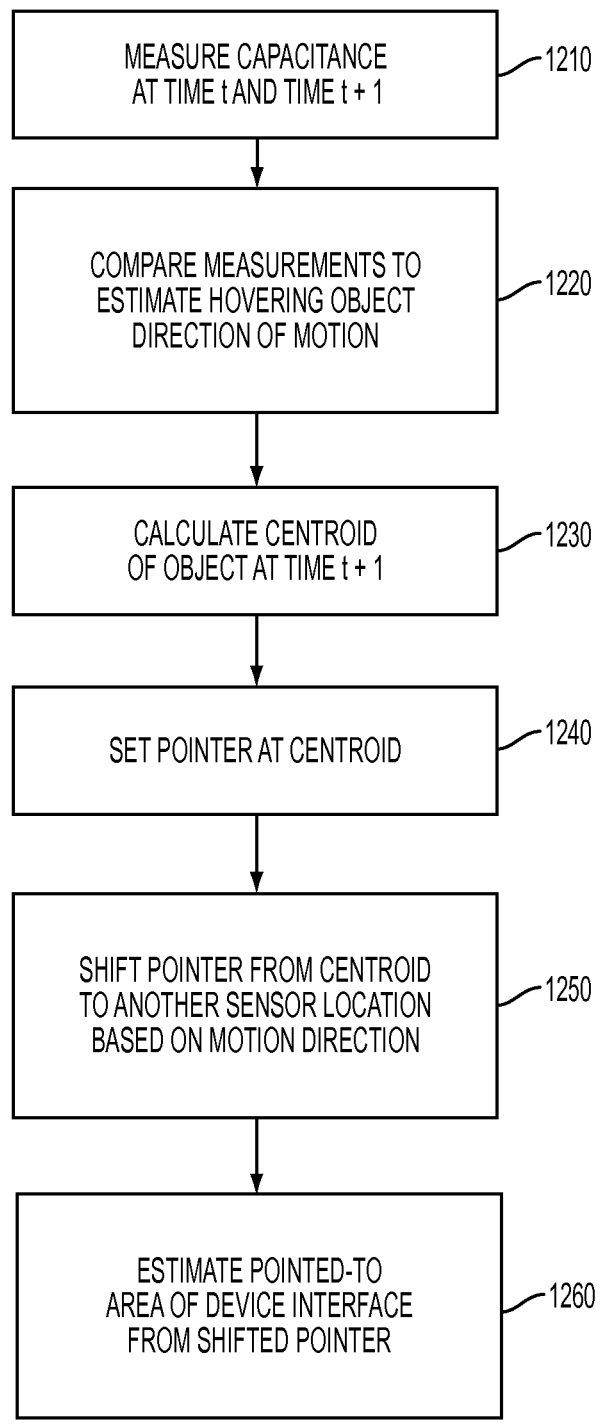
FIG. 12 illustrates another exemplary method to profile an object shape in a touch and hover sensing device according to various embodiments.

FIG. 12 illustrates another exemplary method to profile an object shape in a touch and hover sensing device according to various embodiments. In the example of FIG. 12, the motion of a hovering object, e.g., a hand, relative to the device can be used to determine where the object is pointing. Capacitance at times t and t+1 can be measured to detect a hovering object at those times (1210). The measurements can be compared to estimate a direction of motion of the hovering object (1220). For example, sensor locations that detected the object can be used to determine the object positions at times t and t+1. The shift in position between times t and t+1 can then be used to determine the object direction of motion according to any suitable motion detection algorithm. The centroid of time t+1 measurement can be calculated (1230). For example, the sensor locations corresponding to the object can be used to determine the object area. The centroid of the object area and its corresponding sensor location can then be calculated using any suitable centroid detection algorithm. A pointer can be set at the centroid to indicate an initial estimate of where the object is pointing (1240). The pointer location can be shifted from the centroid location in the determined direction of motion to another sensor location of the object area that is more indicative of where the object is pointing and that is according to the object's motion (1250). For example, if the object is moving in an upward direction toward the top of the UI display, the pointer location can be shifted in the upward direction from the centroid location to an uppermost sensor location of the object area. A trajectory or some other extrapolation can be made from the shifted pointer onto the device UI display to estimate the pointed-to area (1260).

It is to be understood that other method are also possible to profile an object shape according to the needs of the device.

Distance and Area Differentiation

Figure 13:
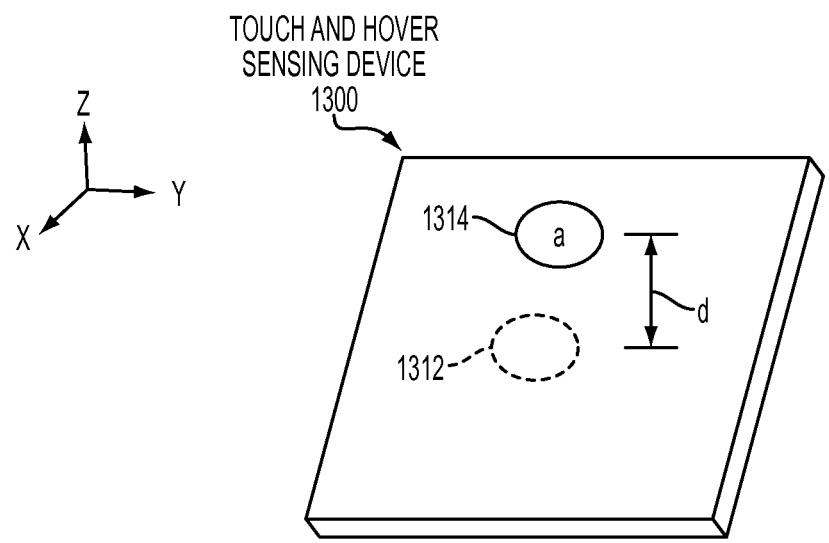
FIG. 13 illustrates an exemplary touch and hover sensing device sensing a small close object and a large distant object that can be differentiated from each other according to various embodiments.
Figure 13:
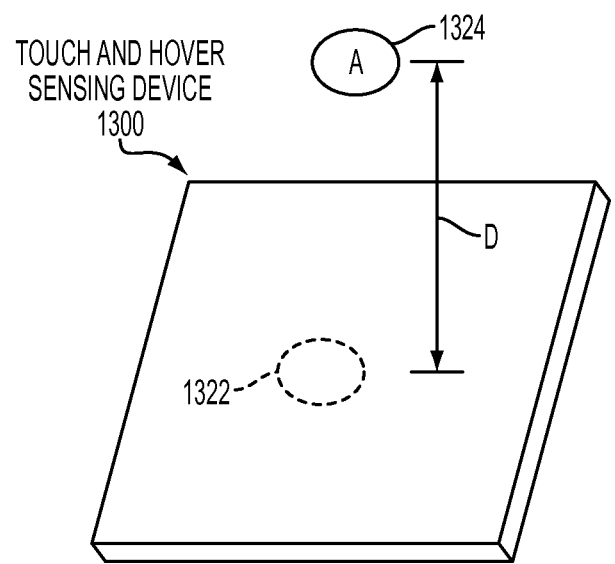

A smaller object close to a sensing device and a larger object farther away from a sensing device can generate similar sensing signals such that it can be difficult to differentiate between them to determine their areas and/or distances from the device, which may adversely affect subsequent device actions based on the signals. FIG. 13 illustrates such an example. Here, smaller object 1314 having area a can be at distance d from touch and hover sensing device 1300, whereas larger object 1324 having area A can be at distance D from the device, where A>a and D>d. However, hover signal 1312 for the smaller object 1314 can be substantially the same as hover signal 1322 for the larger object 1324 such that the differences in the respective distances d and D and areas a are A are not discernible.

Figure 14:
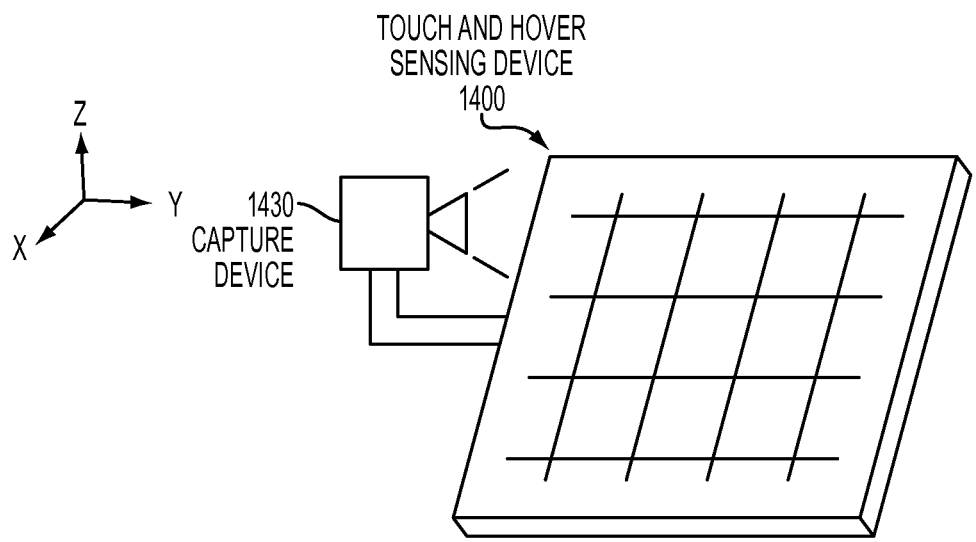
FIG. 14 illustrates an exemplary touch and hover sensing device that can differentiate between a small close object and a large distant object according to various embodiments.

FIG. 14 illustrates an exemplary touch and hover sensing device that can differentiate between a small close object and a large distant object according to various embodiments. In the example of FIG. 14, visual capture device 1430 can be disposed at a position proximate to the sensor lines of touch and hover sensing device 1400 to capture image(s) and/or video of a hovering object. The captured image(s) and/or video can then be used to determine the distance and area of the object. The distance of the object from the touch and hover sensing device can be determined according to the object and device positions in the captured image(s) and/or video using any suitable image/video object recognition algorithm. The area of the object can be determined according to the size of the object in the captured image(s) and/or video using any suitable image/video object recognition algorithm. Examples of visual capture devices can include a still camera, a video camera, and the like. In some embodiments, the capture device 1430 can be integrated with the touch and hover sensing device 1400. In other embodiments, the capture device 1430 can be separate and proximate to the touch and hover sensing device 1400.

Figure 15:
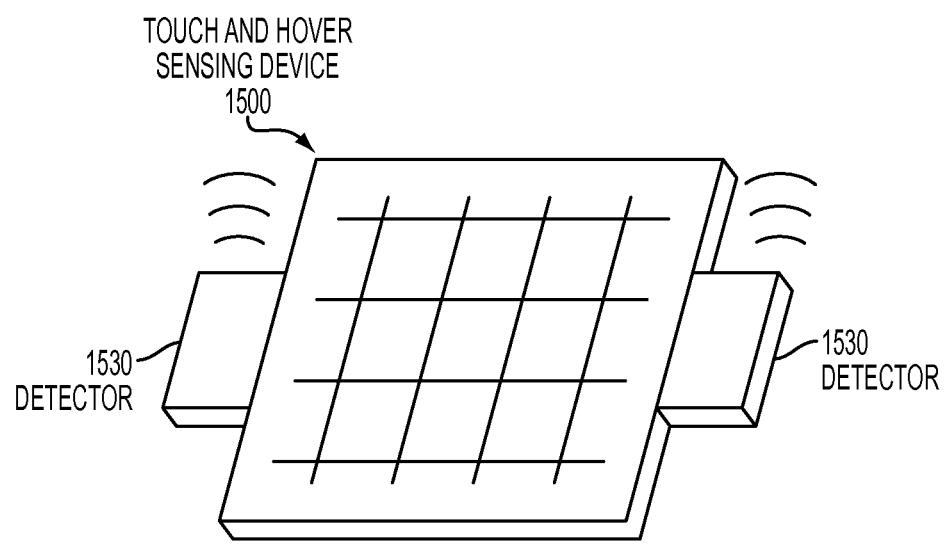
FIG. 15 illustrates another exemplary touch and hover sensing device that can differentiate between a small close object and a large distant object according to various embodiments.

FIG. 15 illustrates another exemplary touch and hover sensing device that can differentiate between a small close object and a large distant object according to various embodiments. In the example of FIG. 15, detectors 1530 can be disposed at positions proximate to the sensor lines of touch and hover sensing device 1500 to detect a hovering object. The distance and area of the object can be determined according to various characteristics of the detectors' signal using any suitable signal processing algorithm. Examples of the detectors can include sonar, infrared, optical, radio, and the like. In some embodiments, the detectors 1530 can be integrated with the touch and hover sensing device 1500. In other embodiments, the detectors 1530 can be separate and proximate to the touch and hover sensing device 1500.

Figure 16:
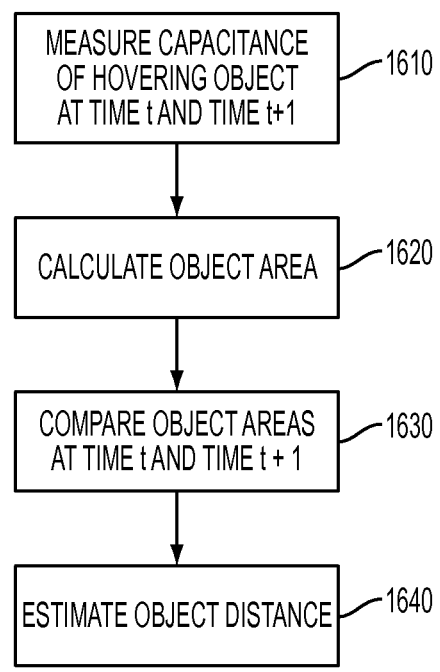
FIG. 16 illustrates an exemplary method to differentiate between a small close object and a large distant object in a touch and hover sensing device according to various embodiments.

In addition or alternative to using capture devices and detectors, the sensing signals can be used to differentiate between object distances and areas, as described in FIG. 16.

FIG. 16 illustrates an exemplary method to differentiate between a small close object and a large distant object using sensing signals in a touch and hover sensing device according to various embodiments. In the example of FIG. 16, capacitance at times t and t+1 can be measured to detect a hovering object at those times (1610). The measurements can be used to determine an object area (1620). For example, sensor locations that detected the object can be used to determine the object areas at times t and t+1. The areas can be compared to determine the change in area from time t to time t+1 (1630). Based on the change in area, the distance of the object can be estimated (1640). One of the determined object area, e.g., at time t+1, and the estimated distance can be used in subsequent device action, e.g., to select an element on a display user interface.

It is to be understood that other methods can be used to determine object area and distance based on object sensing signals according to various embodiments.

Concurrent Touch and Hover

Figure 17:
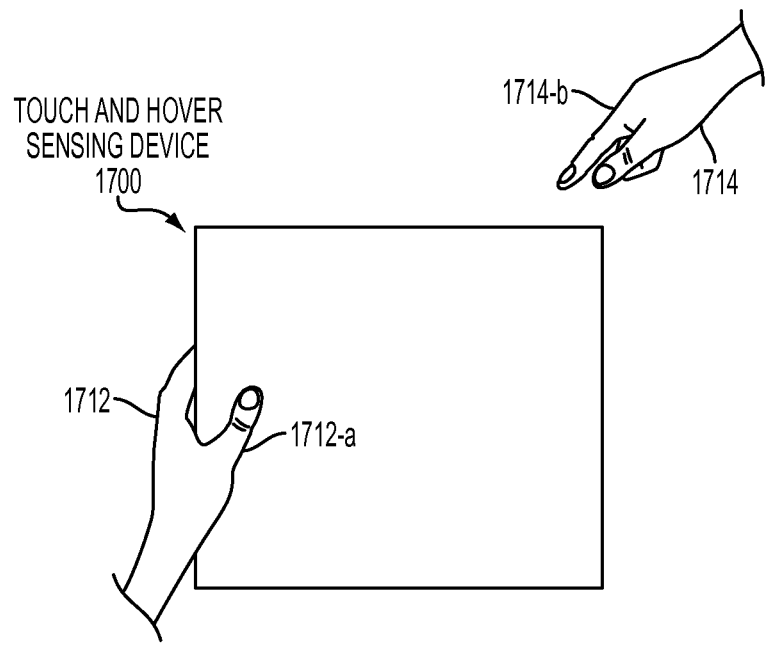
FIG. 17 illustrates an exemplary touch and hover sensing device sensing concurrently touching and hovering objects according to various embodiments.

As described previously, an object touching a sensing device can generally produce a stronger signal than an object hovering over the device, such that the touch signal can mask or otherwise reduce detectability of the hover signal when they occur at the same time. Unlike the instance of FIG. 2, in this instance, the touch signal is intentional and desirable along with the hover signal. Therefore, the stronger touch signal masking the weaker hover signal can be problematic. FIG. 17 illustrates such an example. Here, a user can grasp touch and hover sensing device 1700 with left hand 1712, using thumb 1712-a to touch the device sensing area to provide a touch input, and at the same time hover over the device with right hand 1714, using finger 1714-b to point to areas on the device's UI display to provide a hover input, where the touch and hover inputs can work together to cause some action. Because the thumb 1712-a touches the device 1700, the sensors proximate to the thumb can generate a stronger signal, in some cases, a saturated signal. Whereas, because the finger 1714-b hovers above the device 1700, the sensors detecting the finger can generate a weaker signal, in some cases, a much weaker signal. Some adjustment to the device and/or the signals can be made to ensure that both the touch signal and the hover signal are concurrently sensed.

An example application of concurrent touch and hover sensing can include using a thumb touch to select a button that changes to a particular operating mode of the device while using a finger hover to select an action to perform during that operating mode.

Figure 18:
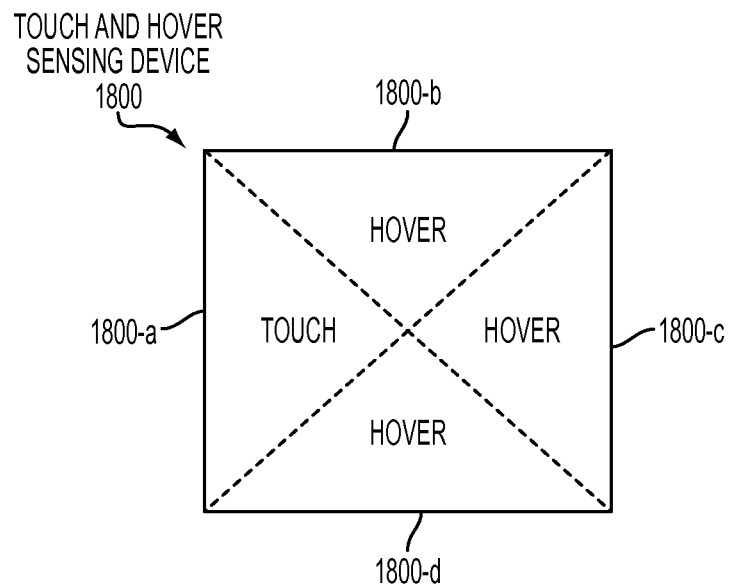
FIG. 18 illustrates an exemplary touch and hover sensing device that can concurrently sense a touching object and a hovering object according to various embodiments.

FIG. 18 illustrates an exemplary touch and hover sensing device to concurrently sense a touching object and a hovering object according to various embodiments. In the example of FIG. 18, touch and hover sensing device 1800 can be partitioned (symbolically illustrated by broken lines) into quadrants 1800-a, 1800-b, 1800-c, and 1800-d such that the sensing signals associated with the sensors in these quadrants can also be partitioned. The quadrants having stronger touch signals can be detectible and separate from the quadrants having weaker hover signals, such that both the touch signals and the hover signals can be recovered for further processing. One or more of the quadrants where the touch signal is more likely to occur can be designated as a touch quadrant. Similarly, one or more of the quadrants where the hover signal is more likely to occur can be designated as a hover quadrant. Some quadrants can be also designated dual quadrants where either touch or hover signals are likely to occur. In this example, the left-most quadrant is designated as a touch quadrant because a user is more likely to grasp the device 1800 in this region and use the thumb of the grasping hand to provide a touch input. The remaining quadrants are designated as the hover quadrants because a user is more likely to point to the device UI display in these areas with a pointing hand or other object. In some embodiments, the partitioning can be performed in software and/or firmware, where the quadrants can share sensor lines (not shown). In some alternate embodiments, the partitioning can be done in hardware, where each quadrant can have separate sensor lines. To ensure that both touch and hover signals are properly sensed, the device 1800 can operate in a mutual capacitance mode, where the sensor lines measure mutual capacitance. Alternatively, in some embodiments, the device 1800 can operate in a self capacitance mode and employ similar approaches as described above to detect but retain touch signals along with hover signals.

Although the touch sensing device of FIG. 18 is partitioned into quadrants, other numbers of partitions and/or configurations is also available, provided that each partition includes at least one edge of the device for connecting the sensor lines to drive and sense circuitry.

Figure 19:
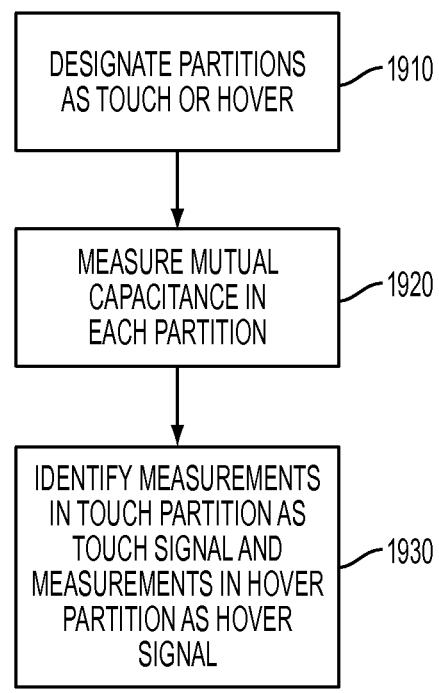
FIG. 19 illustrates an exemplary method to concurrently sense a touching object and a hovering object in a touch and hover sensing device according to various embodiments.

FIG. 19 illustrates an exemplary method to concurrently sense a touching object and a hovering object using the device of FIG. 18. In the example of FIG. 19, partitions can be designated as a touch partition, a hover partition, and/or a dual partition based on the likelihood of touch, hover, or both, respectively, occurring at that partition (1910). Mutual capacitance can be measured in each partition (1920). Mutual capacitance sensing can more easily detect multiple objects, e.g., concurrent touching and hovering objects, than self capacitance sensing in most cases. A measurement in a designated touch partition that is indicative of a detected object can be identified as a touch signal; whereas, a measurement in a designated hover partition that is indicative of a detected object can be identified as a hover signal (1930). In the case of a detected signal in a dual partition, in some embodiments, the signal can be ignored or discarded as indeterminable. In other embodiments, the magnitude of the signal can be compared to a predetermined threshold and deemed a touch signal if above the threshold and a hover signal if at or below the threshold.

Figure 20:
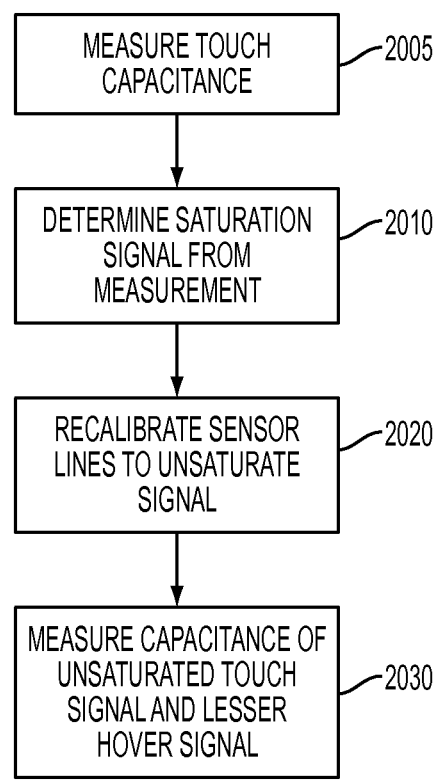
FIG. 20 illustrates another exemplary method to concurrently sense a touching object and a hovering object in a touch and hover sensing device according to various embodiments.

FIG. 20 illustrates another exemplary method to concurrently sense a touching object and a hovering object in a touch and hover sensing device according to various embodiments. Here the device can, but need not, be partitioned. In the example of FIG. 20, while there is a touch at the device, a capacitance can be measured (2005). If the measurement saturates the sensor lines, the measurement can be designated as a touch saturation signal (2010). The device can be recalibrated based on the saturated measurement such that subsequent touches at the device do not saturate the sensor lines (2020). In some embodiments, to recalibrate the device, amplitudes of voltages driving the sensors can be reduced proportionate to the touch saturation signal so as to provide an unsaturated capacitance measurement. In some embodiments, to recalibrate the device, capacitance measurements can be reduced proportionate to the touch saturation signal so as to provide an unsaturated capacitance measurement. During recalibration, care can be taken to balance unsaturating a touch signal with appreciably reducing detectability of a hover signal as well as the overall signal-to-noise ration of the signals. After the recalibration, subsequent touch signals can be unsaturated and detectible along with hover signals (2030).

It is to be understood that other methods for detecting concurrent hover and touch events can also be used according to various embodiments.

Multi-Hover Detection

Figure 21:
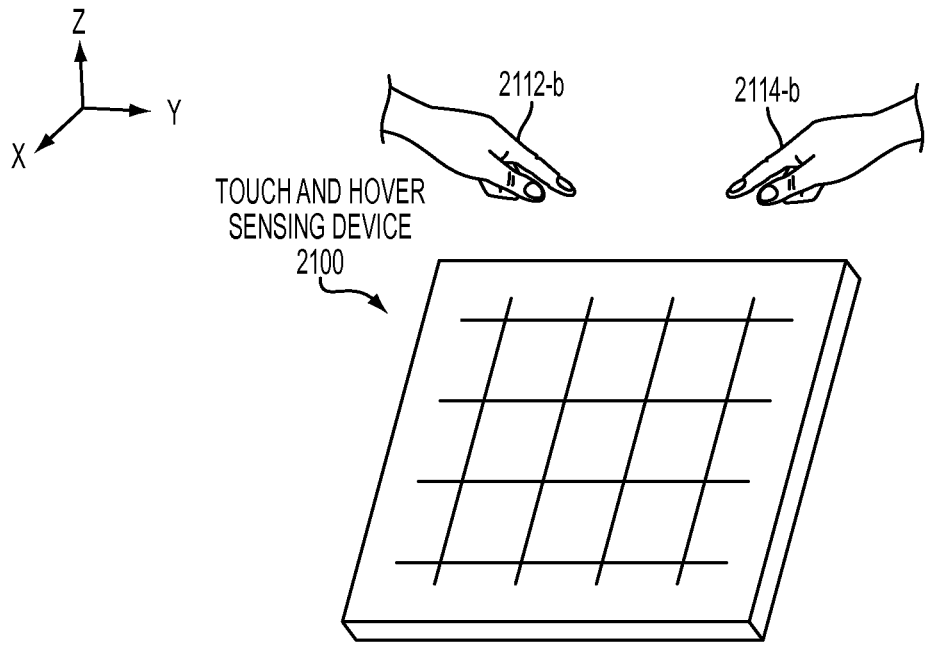
FIG. 21 illustrates an exemplary touch and hover sensing device sensing multiple hovering objects according to various embodiments.

Detecting multiple hovering objects in a sensing device can be desirable for device actions that need multiple inputs. FIG. 21 illustrates such an example. Here, finger 2112-*b* can hover above one area of touch and hover sensing device 2100 while finger 2114-*b* can hover above another area of the device. The device 2100 can then detect both fingers and generate hover signals for further processing.

Figure 22:
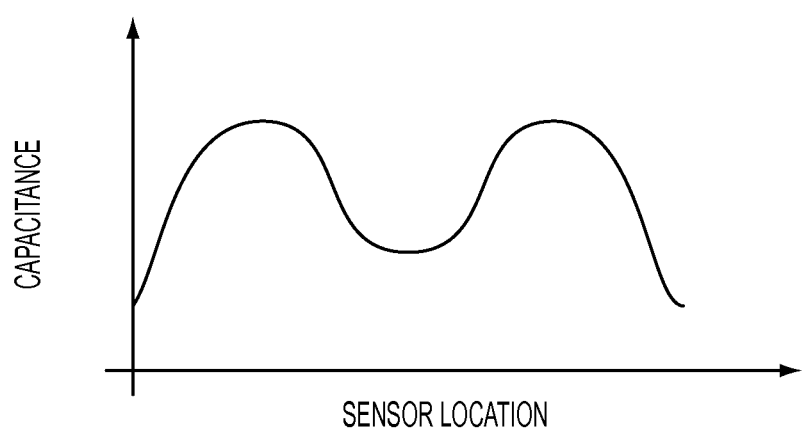
FIG. 22 illustrates an exemplary graph depicting capacitance measurement versus sensor position in a touch and hover sensing device according to various embodiments.
Figure 23:
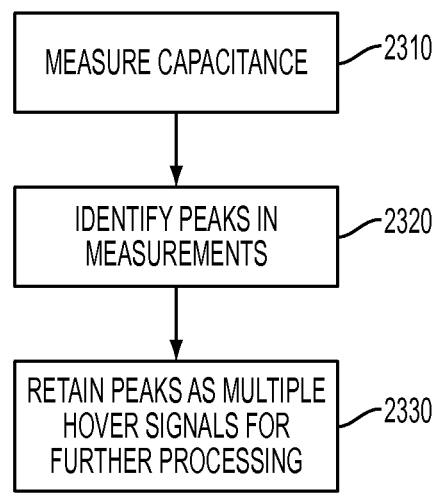
FIG. 23 illustrates an exemplary method to sense multiple hovering objects in a touch and hover sensing device according to various embodiments.

FIG. 22 illustrates an exemplary graph of hover signals generated from multiple hovering objects in a touch and hover sensing device according to various embodiments. In the example of FIG. 22, capacitance measurements along a sensor line can have peaks at sensor locations proximate to the hovering objects. The measurements can be processed to determine hover signals for the hovering objects as illustrated in FIG. 23, for example. In some embodiments, to ensure that multiple hover signals are properly sensed, the device can operate in a mutual capacitance mode.

In the example of FIG. 23, capacitance can be measured (2310). Peaks in the capacitance measurements can be identified, indicative of multiple hovering objects (2320). Any suitable peak detection algorithm can be used to identify the peaks. Some stray or small identified peaks can be ignored or discarded to prevent false detections. Each identified peak can be considered a hover signal of a hovering object and retained for further processing (2330).

In some embodiments, the touch and hover sensing device can be partitioned into quadrants (or other partitions) such that multi-hover can be realized in each quadrant, thereby increasing the number of hovering objects that can be detected.

Signal Drift Compensation

When a sensing device experiences environmental changes, e.g., changes in ambient temperature, humidity, or pressure; operating changes, e.g., component start-up, shutdown, prolonged operation, or noise; or mechanical changes, e.g., component shifts, expansion, or contraction, baseline capacitance of the device can change over time. Baseline capacitance refers to the capacitance of the device when there is no touch or hover at the device. As a result, capacitance measurements indicative of a touch or a hover at the device can similarly change. This is known as signal drift. Signal drift can adversely affect device action, particularly when the action is responsive to a particular capacitance measurement value or a particular capacitance range of values. To compensate for signal drift, the baseline capacitance can be reset periodically to take into account any environmental, operating, mechanical, and other changes. The new baseline can then be applied to a touch or hover capacitance measurement to correct the measurement.

Figure 24:
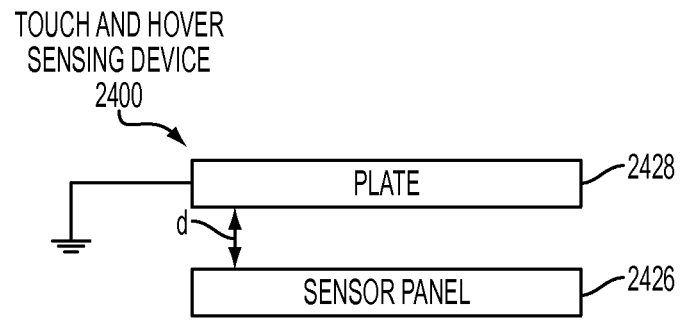
FIG. 24 illustrates an exemplary touch and hover sensing device that can compensate for signal drift according to various embodiments.

FIG. 24 illustrates an exemplary touch and hover sensing device that can compensate for signal drift according to various embodiments. In the example of FIG. 24, touch and hover sensing device 2400 can include touch and hover sensor panel 2426 and cover plate 2428. The panel 2426 can include sensor lines for generating capacitance measurements indicative of a touching object and/or a hovering object. The plate 2428 can be grounded and can cover the panel 2426 at a distance d from the panel. The plate 2428 can be a device cover, for example, that a user can pull down or slide over the panel 2426 after the user finishes with the device 2400 temporarily. Alternatively, the plate 2428 can be one side of a housing, for example, into which a user can place the device 2400 for storage or transport after the user finished with the device 2400 temporarily. During these periods of non-use, the device can compensate for signal drift. For example, when the plate 2428 covers the panel 2426, neither a touching nor hovering object is likely at the panel (since the panel cannot be used with the plate in place) such that any capacitance changes in the sensor lines at the panel can be solely or substantially due to signal drift. Capacitance measurements can be taken and the panel 2426 can be calibrated with the measurements as the new baseline. When the plate 2428 does not cover the panel 2426, a touching or hovering object is more likely at the panel such that resetting the baseline capacitance can be suspended until the plate once again covers the panel.

Figure 25:
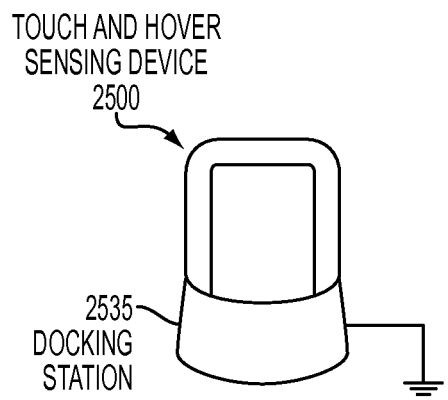
FIG. 25 illustrates another exemplary touch and hover sensing device that can compensate for signal drift according to various embodiments.

FIG. 25 illustrates another exemplary touch and hover sensing device that can compensate for signal drift according to various embodiments. In the example of FIG. 25, touch and hover sensing device 2500 can be in docking station 2535. The docking station 2535 can be grounded. When the device 2500 is docked, neither a touching nor hovering object is likely at the device such that any capacitance changes at the device 2500 can be solely or substantially due to signal drift. Capacitance measurements can be taken and the device 2500 can be calibrated with the measurements as the new baseline. When the device 2500 is undocked, a touching or hovering object is more likely at the device such that resetting the baseline capacitance can be suspended until the device is once again docked.

In some embodiments, a touch and hover sensing device may not have either a cover or a docking station. In such embodiments, when a touch or hover is not detected, capacitance measurements can be taken and the device can be calibrated with the measurements as the new baseline. This can be done when the device is idle for an extended period, when the device is in use but between touch or hover detections, or in some otherwise non-touch or non-hover circumstance.

Figure 26:
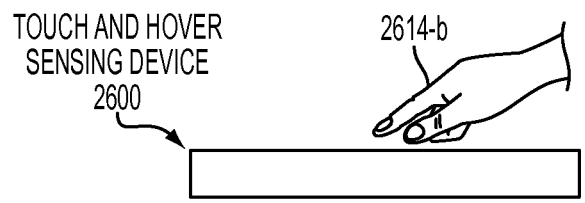
FIG. 26 illustrates an exemplary touch and hover sensing device compensating for signal shift according to various embodiments.

Alternatively, rather than waiting until there is no touch or hover at the device, a new baseline capacitance can be set during a touch or hover. FIG. 26 illustrates such an example. Here, while finger 2614-*b* touches touch and hover sensing device 2600 for a predetermined time period without moving, capacitance measurements can be taken during the time period to determine how the capacitance drifts over time. The average of that drift can be the new baseline. Similarly, the finger hovering without moving can be used to reset the baseline capacitance.

Figure 27:
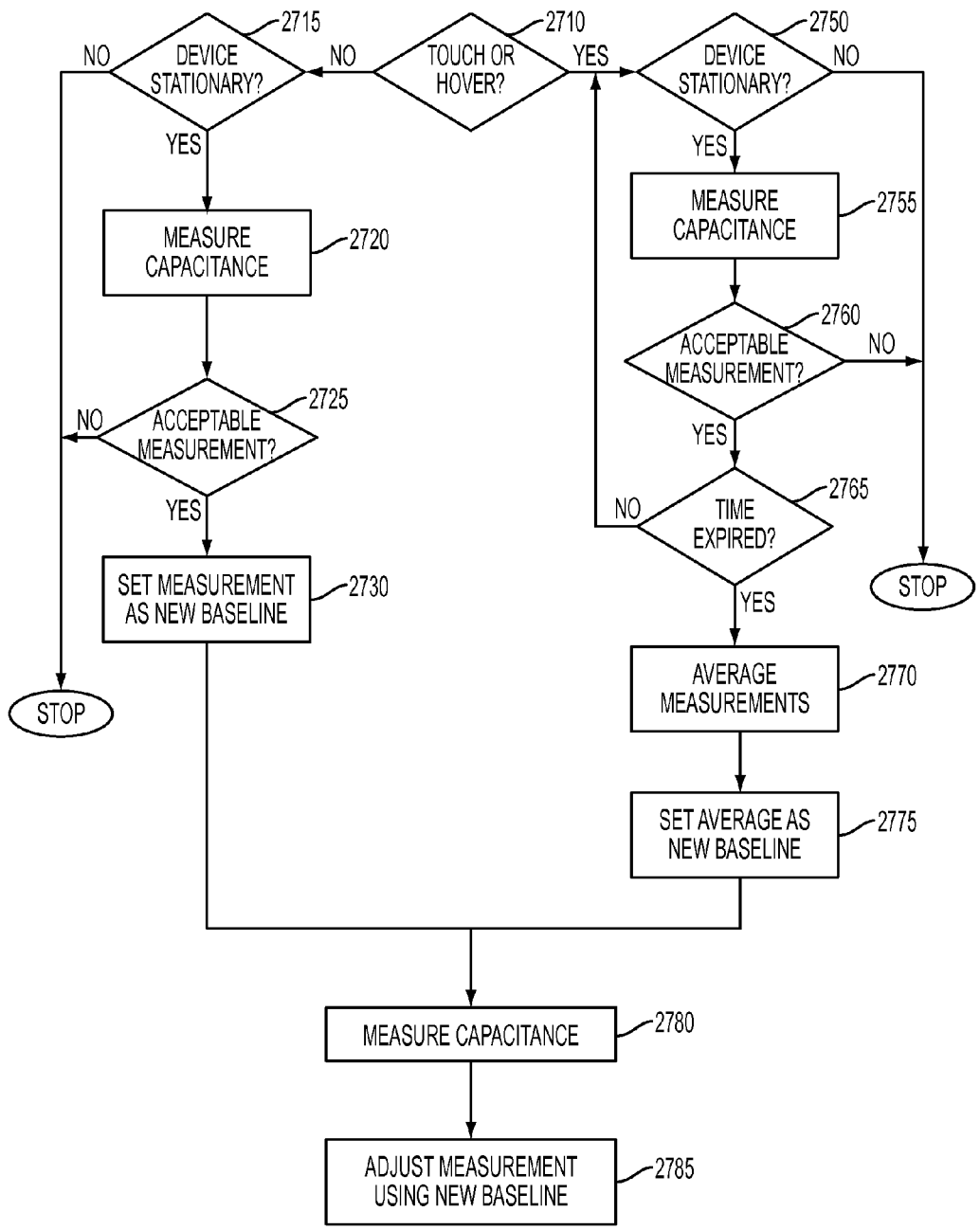
FIG. 27 illustrates an exemplary method to compensate for signal drift in a touch and hover sensing device according to various embodiments.

FIG. 27 illustrates an exemplary method to compensate for signal drift in a touch and hover sensing device according to various embodiments. In the example of FIG. 27, a determination can be made whether there is a touch or hover at the touch and hover sensing device (2710). In some embodiments, a user can input either an indication that there is no touch or hover or an indication to reset the baseline capacitance. In some embodiments, the touch and hover sensing device can determine that there is no touch or hover at the device, for example, by detecting a cover plate over the device (as in FIG. 24), the device in a docking station (as in FIG. 25), or some other device parameter indicative of a non-touch and non-hover condition.

If there is no touch or hover at the device, a determination can be made whether the device is substantially stationary (2715). Typically a substantially stationary device can be more desirable to reset the baseline capacitance to avoid capacitance measurements being adversely affected by device motion. The device's motion can be determined using any suitable motion detector or detection algorithm according to the needs of the device. If the device is moving, resetting the baseline capacitance can be suspended until conditions are more favorable. If the device is not moving, capacitance measurements can be taken to compensate for signal drift (2720). A determination can be made whether the capacitance measurements indicate some unacceptable condition, e.g., the measurements are either negative or drifting in a negative direction (2725). If so, resetting the baseline capacitance can be suspended until conditions are more favorable. Otherwise, if the capacitance measurements are acceptable, the measurements can be set as the new baseline capacitance for the device, thereby compensating for the signal drift (2730).

If there is a touch or hover at the device, a determination can be made whether the touching or hovering object is substantially stationary (2750). If not, the device is likely in operation or the object is shaking such that resetting the baseline can be suspended until conditions are more favorable. If the touching or hovering object is substantially stationary, the object is likely touching or hovering to reset the baseline capacitance (as in FIG. 26). The capacitance can be measured at the device (2755). A determination can be made whether the capacitance measurements indicate some unacceptable condition, e.g., the measurements are either negative or drifting in a negative direction (2760). If so, resetting the baseline capacitance can be suspended until conditions are more favorable. Otherwise, if the capacitance measurements are acceptable, a determination can be made whether a predetermined time period associated with the baseline capacitance reset has expired (2765). If the time period has not expired, then additional capacitance measurements can be taken as long as the object remains stationary (2750-2765). If the time period has expired, the capacitance measurements taken over the predetermined time period can be averaged (2770). The average can be set as the new baseline capacitance for the device, thereby compensating for the signal drift (2775).

In some embodiments, the user can manually input a new baseline capacitance to compensate for the signal drift.

After the baseline capacitance has been reset, a capacitance can be measured indicative of either a touch or hover at the device (2780). The new baseline capacitance, compensated for signal drift, can be subtracted from the capacitance measurement to determine the capacitance change as a result of the touch or hover (2785).

It is to be understood that other methods can also be used for resetting the baseline capacitance to compensate for signal drift according to the needs of the device.

Sensor Resistance Compensation

As described previously, due to resistance from touch and hover sensing device sensor lines' conductive material, the ability of a drive voltage to travel along a sensor line can be influenced by the drive voltage's frequency, where higher frequencies have more difficulty than lower frequencies. As a result, at higher frequency drive voltages, the sensors at the start of the sensor lines can see stronger drive voltages than sensors at the end of the sensor lines, thereby generating stronger electric fields and subsequent touch and hover signals. At lower frequency drive voltages, the sensors all along the sensor lines can be driven similarly, thereby generating acceptable electric fields and subsequent touch and hover signals everywhere. While higher frequency drive voltages are desirable, larger touch and hover sensing devices can have difficulty driving all the sensors along longer sensor lines. To compensate for the sensor lines' resistance, various sensor configurations can be used as described below.

Figure 28:
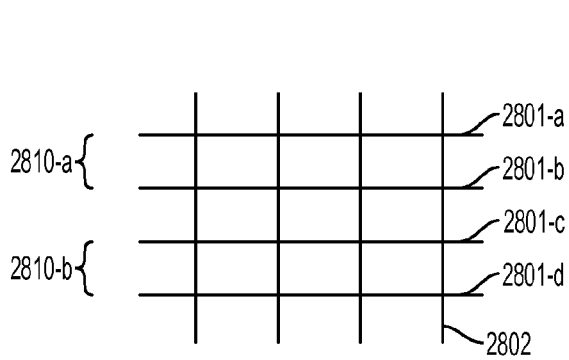
FIG. 28 illustrates an exemplary touch and hover sensing device that can compensate for sensor resistance according to various embodiments.

FIG. 28 illustrates an exemplary touch and hover sensing device that can compensate for sensor resistance according to various embodiments. In the example of FIG. 28, adjacent sensor lines 2801-*a* through 2801-*d* of touch and hover sensing device 2800 can be ganged together to lower sensor resistance. Ganging the sensor lines 2801-*a* and 2801-*b* can effectively form single sensor line 2810-*a*, where the lines' individual resistances are now in parallel, thereby halving the total resistance of the ganged lines. The sensor lines 2801-*c* and 2801-*d* can be similarly ganged together to form single sensor line 2810-*b*. Ganging can also lower the resolution of the device 2800 by combining two sensor lines into one. Accordingly, lowering the resistance to produce stronger signals can be balanced against lowering the resolution of those signals. Hence, the amount of ganging can be determined so as to reduce the sensor lines' resistance while maintaining an appropriate sensing resolution.

In this example, the horizontal sensor lines are ganged together. However, it is to be understood that the vertical sensor lines can be similarly ganged together according to the needs of the device.

Figure 29:
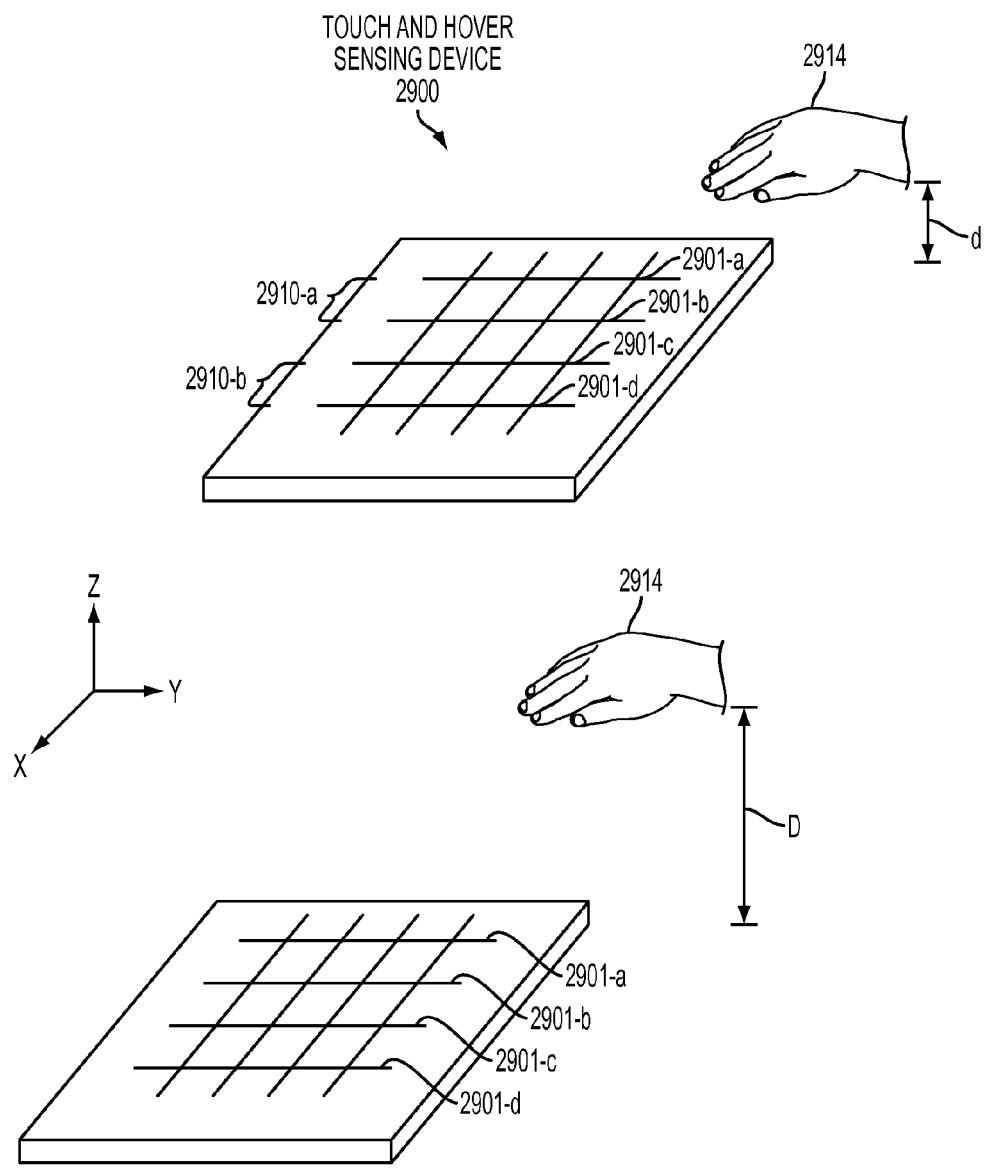
FIG. 29 illustrates another exemplary touch and hover sensing device that can compensate for sensor resistance according to various embodiments

FIG. 29 illustrates another exemplary touch and hover sensing device that can compensate for sensor resistance according to various embodiments. In the example of FIG. 29, touch and hover sensing device 2900 can dynamically gang sensor lines according to the distance of hovering object 2914. The sensitivity of the device 2900 to the object 2914 can be a function of the object's area and distance. When the object 2914 is farther away at distance D, its area can be smaller such that the capacitance measurement at the device 2900 can be smaller. A higher sensor resolution can be preferred to properly sense the distant object. Accordingly, the sensor lines 2901-*a* through 2901-*d* can remain separate to provide a higher resolution. Conversely, when the object 2914 is closer at distance d, its area can be larger such that the capacitance measurement at the device 2900 can be larger. A lower sensor resolution can still properly sense the object. Accordingly, the sensor lines 2901-*a* and 2901-*b* can be ganged together as single sensor line 2910-*a* and the sensor lines 2901-*c* and 2901-*d* can be ganged together as sensor line 2910-*b* to realize lower sensor resistance. Ganging can be performed for horizontal sensor lines, vertical sensor line, or both.

Figure 30:
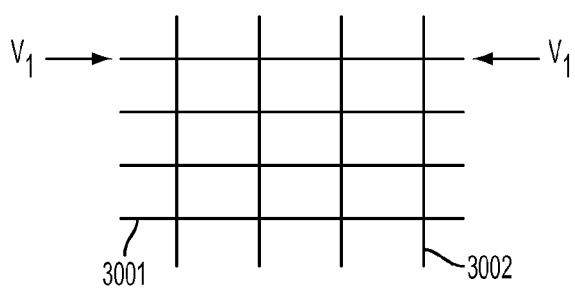
FIG. 30 illustrates another exemplary touch and hover sensing device that can compensate for sensor resistance according to various embodiments

FIG. 30 illustrates another exemplary touch and hover sensing device that can compensate for sensor resistance according to various embodiments. In the example of FIG. 30, drive voltage $V_1$ can be applied to sensors along sensor lines 3001 of touch and hover sensing device 3000 from both directions at the same time such that the distance that the voltage has to travel along the lines is halved, thereby reducing the effects of the sensor resistance. In some embodiments, the drive voltages can be applied to sensors along sensor lines 3002 from both top and bottom directions at the same time.

Figure 31:
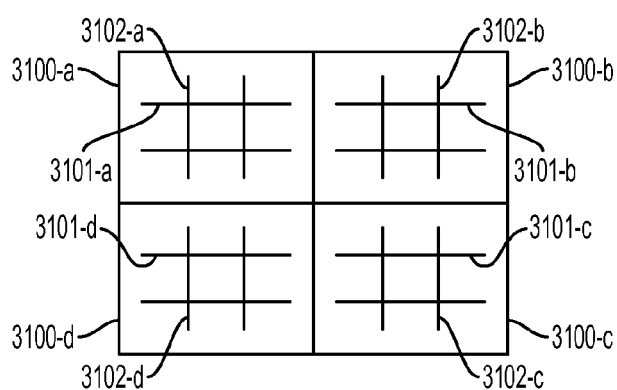
FIG. 31 illustrates another exemplary touch and hover sensing device that can compensate for sensor resistance according to various embodiments.

FIG. 31 illustrates another exemplary touch and hover sensing device that can compensate for sensor resistance according to various embodiments. In the example of FIG. 31, touch and hover sensing device 3100 can be physically partitioned (symbolically illustrated by the partitioning lines) into quadrants 3100-a, 3100-b, 3100-c, and 3100-d, where each quadrant can have separate sensor lines 3101, 3102. The partitioning can shorten the sensor lines by half, such that the resistance along each line is halved, thereby reducing the effects of sensor resistance.

Although the touch sensing device of FIG. 31 is partitioned into quadrants, partitioning into other numbers of partitions and/or configurations is also available provided that each partition includes at least one edge of the device for connecting the sensor lines to drive and sense circuitry.

Sensitivity Variation Compensation

Figure 32:
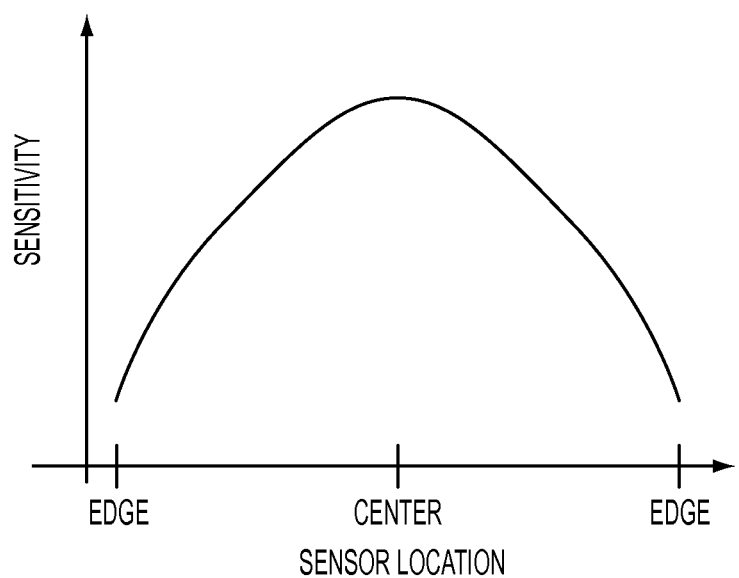
FIG. 32 illustrates an exemplary graph depicting capacitance variation versus sensor location in a touch and hover sensing device according to various embodiments.
Figure 33:
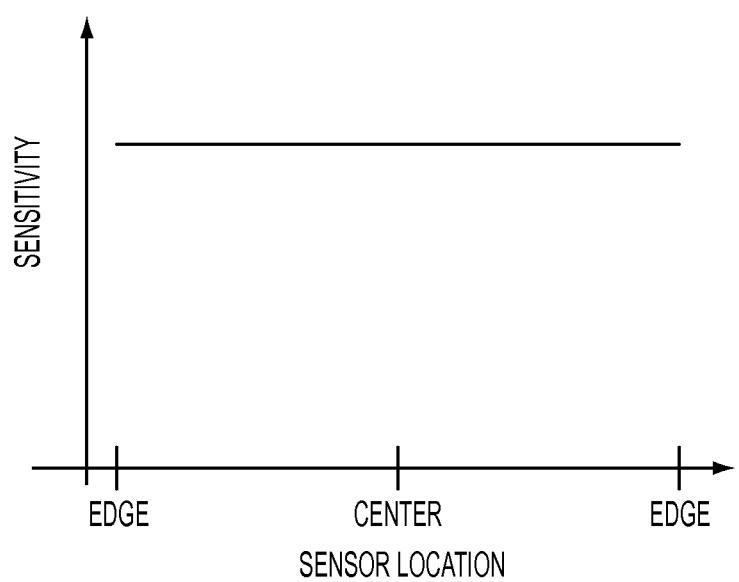
FIG. 33 illustrates a graph depicting compensation for capacitance variation versus sensor location in a touch and hover sensing device according to various embodiments.

Touch or hover sensitivity can vary as a function of sensor location in a touch and hover sensing device. Sensor locations at the edges of the device can generally be less sensitive than sensor locations at the center of the device. FIG. 32 depicts an example of such sensitivity variation as a function of sensor location in the device. Here, sensors at the center of the device can have greater sensitivity than sensors at the edges, where sensitivity decreases from the center to the edges. This means that an object hovering over the center of the device can be sensed farther away than an object hovering over the edges of the device, with the sensing distance decreasing from a maximum at the center to a minimum at the edges. This can produce inconsistent hover signals and, in some cases, missed hover signals at the device edges. Therefore, compensation for such sensitivity variation is desirable as depicted in FIG. 33, where the sensors at various locations have substantially the same sensitivity.

Figure 34:
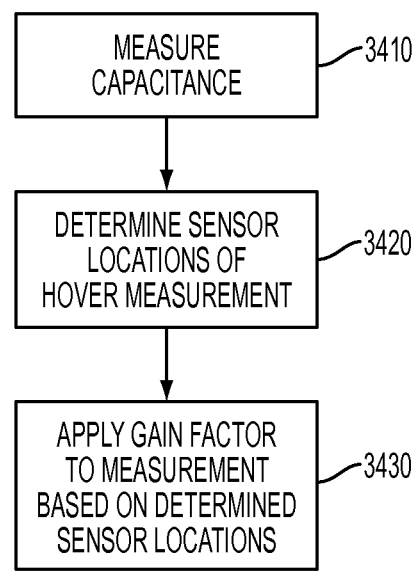
FIG. 34 illustrates an exemplary method to compensate for capacitance variation as a function of location in a touch and hover sensing device according to various embodiments.

To compensate for the sensitivity variation, a gain factor as a function of the hover location can be applied to the capacitance measurement to ensure consistent hover signals at any location on the device. FIG. 34 illustrates an exemplary method to compensate for sensitivity variation in a touch and hover sensing device according to various embodiments. In the example of FIG. 34, capacitance can be measured at the device indicative of a hover at the device (3410). The sensor location of the measurement can be determined (3420). Based on the determined location, a gain factor can be applied to the measurement to increase the measurement as if it is at the center of the device in order to compensate for any variation (3430). In some embodiments, the gain factor can be multiplied with the measurement. The gain factor can be calculated as a ratio representing the amount that the sensitivity is reduced at the hover detected location from the sensitivity at the center of the device.

It is to be understood that other methods are also available to compensation for sensitivity variations according to the needs of the device.

Touch and Hover Switching

As described previously, sensors formed from sensor lines of a touch and hover sensing device can sense both a touching object and a hovering object. In some embodiments, to sense a touching object, the sensors can be configured based on mutual capacitance. In some embodiments, to sense a hovering object, the sensors can be configured based on self capacitance. Switching a sensor between a touch mode and a hover mode can be accomplished through software, firmware, or hardware.

Figure 35:
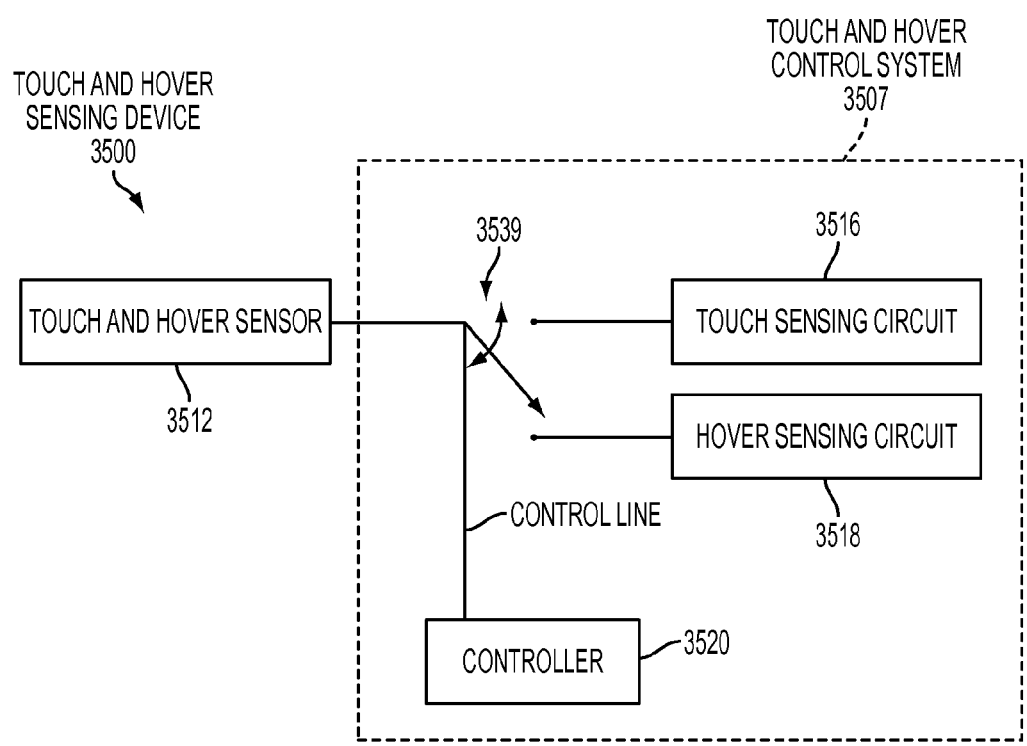
FIG. 35 illustrates an exemplary touch and hover sensing device that can switch between touch and hover modes according to various embodiments.

FIG. 35 illustrates an exemplary touch and hover sensing device that can switch between touch and hover modes according to various embodiments. In the example of FIG. 35, touch and hover sensing device 3500 can have sensor 3512 formed from sensor lines and coupled to touch and hover control system 3507, which can control the sensor switching between touch and hover modes. The control system 3507 can include switch 3539, touch sensing circuit 3516, hover sensing circuit 3518, and controller 3520. The switch 3539 can couple the sensor 3512 to either sensing circuit 3516, 3518. In touch mode, the switch 3539 can couple the sensor 3512 to the touch sensing circuit 3516 to process a touch signal. In hover mode, the switch 3539 can couple the sensor 3512 to the hover sensing circuit 3518 to process a hover signal. The controller 3520 can control the switch 3539 according to any suitable control scheme. In some embodiments, the controller 3520 can switch between the two modes in response to a timer, where the switching occurs when the timer expires. At that point, the timer can be reset to count down to the next switching. In some embodiments, the controller 3520 can switch between the two modes in response to an input, such as a manual input from a user or a logical input from the device when a particular condition occurs.

The switch 3539 can have a substantial capacitance that can interfere with a touch signal or a hover signal from the sensor 3512. The interference can be more adverse in the hover signal where the hover sensing circuit can measure absolute capacitance. In contrast, the interference can be less adverse, and in some cases advantageous, in the touch signal where the touch sensing circuit can measure differential capacitance (or changes in capacitance). For example, in some embodiments, the switch capacitance can be about 20 pF, which can be the dynamic range of the signal. The switch capacitance can be offset with device components as illustrated in FIGS. 36 and 37 below.

Figure 36:
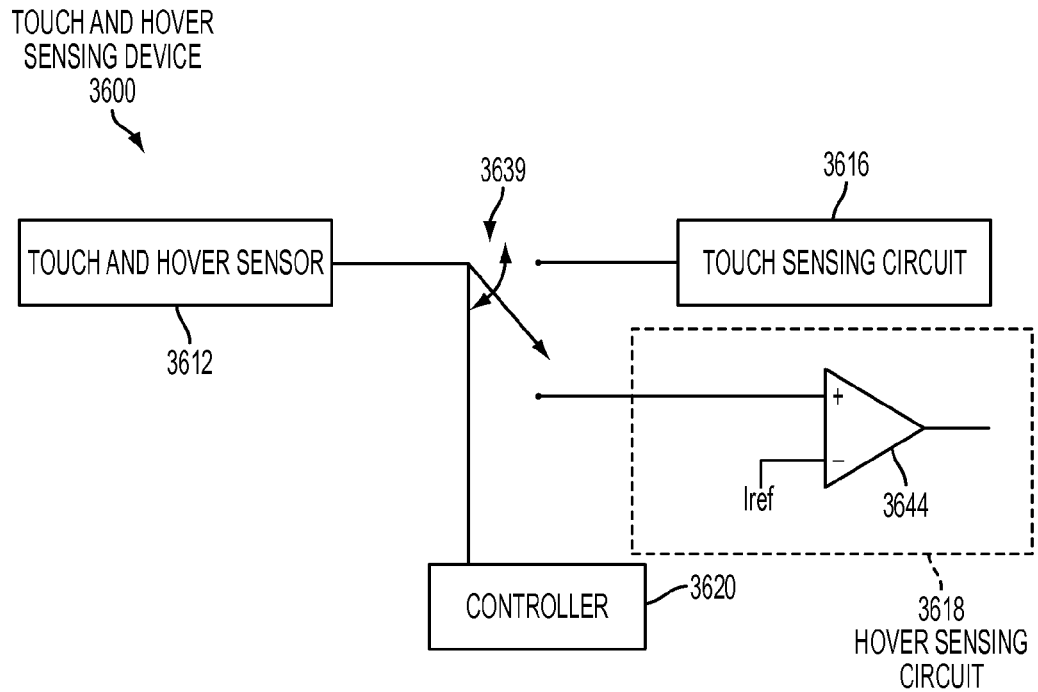
FIG. 36 illustrates another exemplary touch and hover sensing device that can switch between touch and hover modes according to various embodiments.

FIG. 36 illustrates another exemplary touch and hover sensing device that can switch between touch and hover modes, the device having a gain amplifier for offsetting a capacitance that can be introduced into the device by a switch used to change between the two modes. In the example of FIG. 36, gain amplifier 3644 of hover sensing circuit 3618 can receive on one pin a hover sensing signal, indicative of a hover at sensor 3612 and of a capacitance at switch 3639, and can receive on the other pin a reference signal that the amplifier can subtract from the hover sensing signal. The resulting output from the gain amplifier 3644 can be an unsaturated, corrected hover signal of the hover measured at the sensor 3612.

Figure 37:
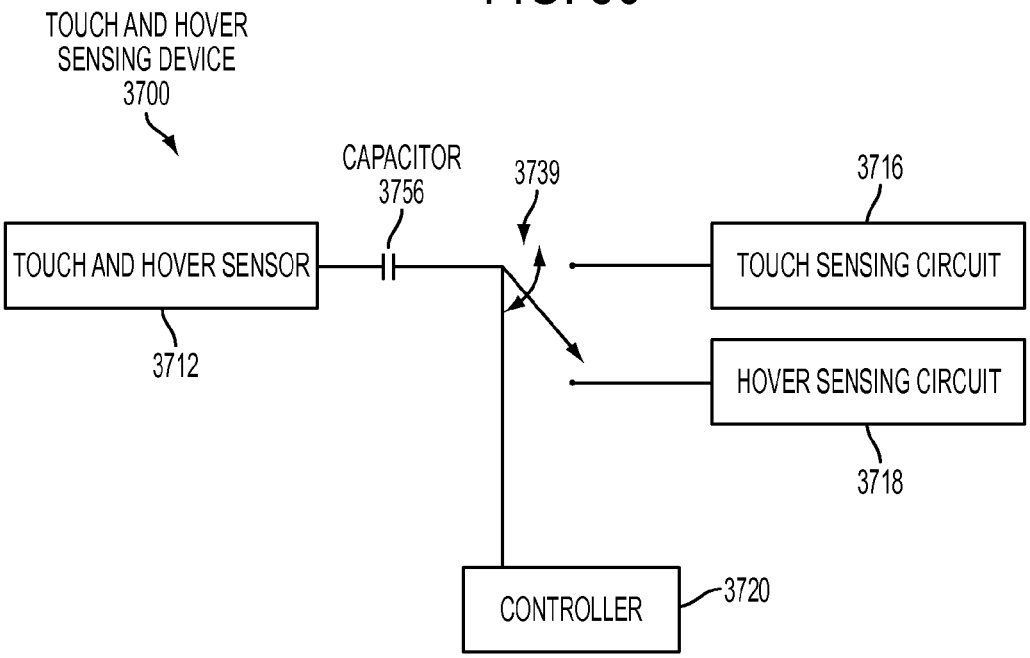
FIG. 37 illustrates another exemplary touch and hover sensing device that can switch between touch and hover modes according to various embodiments.

FIG. 37 illustrates another exemplary touch and hover sensing device that can switch between touch and hover modes having a capacitor for offsetting a capacitance that can be introduced into the device by a switch used to change between the two modes. In the example of FIG. 37, capacitor 3756 can be located between sensor 3712 and switch 3739. The capacitor's capacitance can be in series with the switch capacitance, thereby effectively reducing the total capacitance experienced by hover sensing circuit 3718 by half. The resulting signal to the hover sensing circuit 3718 can be unsaturated with a reduced sensitivity.

Figure 38:
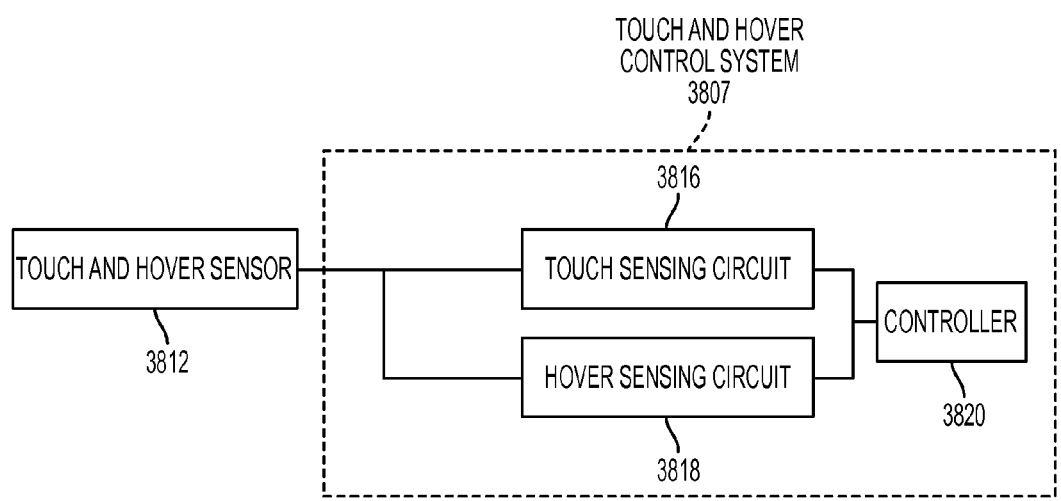
FIG. 38 illustrates another exemplary touch and hover sensing device that can switch between touch and hover modes according to various embodiments.

As an alternative to a switch for switching between touch and hover modes, logic can be used to switch between the modes. FIG. 38 illustrates an exemplary touch and hover sensing device that can switch between touch and hover modes according to various embodiments. In the example of FIG. 38, touch and hover sensing device 3800 can have sensor 3812 formed by sensor lines and coupled to touch and hover control system 3807, which can control the sensor switching between touch and hover modes. The control system 3807 can include touch sensing circuit 3816, hover sensing circuit 3818, and controller 3820. The hover sensing circuit 3818 and the touch sensing circuit 3816 can be connected together on a line coupled to the sensor 3812. The controller 3820 can disable and enable the sensing circuits 3816, 3818 according to the mode. In touch mode, the controller 3820 can send an enable signal to the touch sensing circuit 3816 and a disable signal to the hover sensing circuit 3818, such that the touch sensing circuit can process the sensor signal and the hover sensing circuit can float. In hover mode, the controller 3820 can send a disable signal to the touch sensing circuit 3816 and an enable signal to the hover sensing circuit 3818, such that the hover sensing circuit can process the sensor signal and the touch sensing circuit can float. The controller 3820 can generate and send the disable and enable signals according to any suitable control scheme. In some embodiments, the controller 3820 can generate and send the disable and enable signals upon expiration of a timer. The controller 3820 can reset the timer upon sending the signals. In some embodiments, the controller 3820 can generate and send the disable and enable signals in response to a particular condition at the device, e.g., according to the proximity of an object to the sensor 3812.

There can be parasitic capacitance on the lines connecting the touch sensing circuit 3816 and the hover sensing circuit 3818 together which can interfere with the touch signal and the hover signal from the sensor 3812. As described previously, the interference can be more adverse in the hover signal than the touch signal. In one embodiment, to reduce the effects of the parasitic capacitance on the hover signal, characteristics of the touch sensing circuit and the hover sensing circuit can be adjusted so as to provide a high impedance state through a resistor at the touch sensing circuit to force the voltage path from the sensor to stay at the hover sensing circuit and to impede the parasitic capacitance at the touch sensing circuit from interfering. Other solutions are also available for reducing parasitic capacitance.

Figure 39:
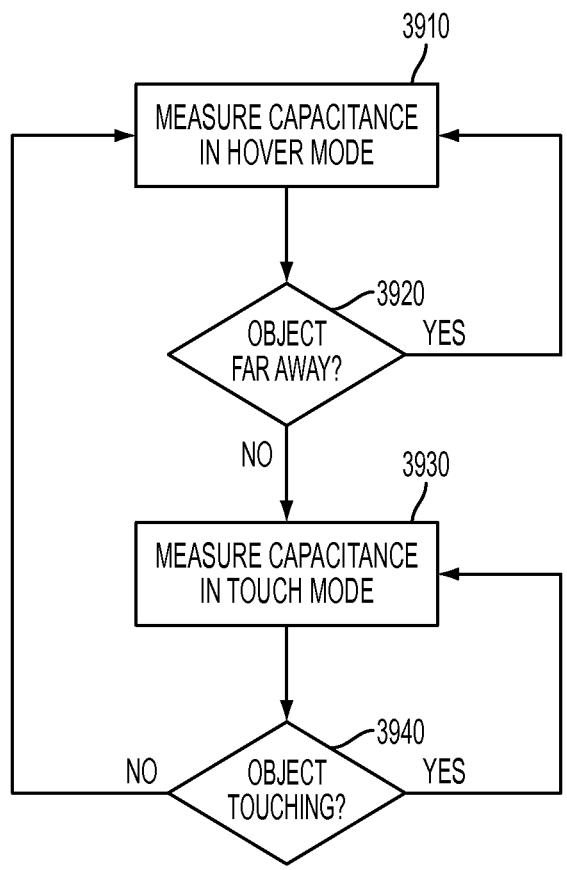
FIG. 39 illustrates an exemplary method to switch between touch and hover modes according to various embodiments.

FIG. 39 illustrates an exemplary method to switch between touch and hover modes of a touch and hover sensing device based on proximity of an object to the device according to various embodiments. This method can be implemented in software, firmware, or hardware according to the needs of the device either to cause a switch to couple a sensor to an appropriate sensing circuit based on the mode, as in FIGS. 35 through 37 or to enable or disable sensing circuits based on the mode, as in FIG. 38. In the example of FIG. 39, a controller of a touch sensing device can switch to hover mode so that a hover sensing circuit of the device can measure a hover capacitance at sensors of the device (3910). In some embodiments, the controller can send a control signal to actuate a switch to couple with the hover sensing circuit. In some embodiments, the controller can send an enable signal to the hover sensing circuit and a disable signal to the touch sensing circuit.

A determination can be made whether an object is far away from the device based on the hover measurement (3920). To perform the determination, the hover measurement can be compared to a threshold hover measurement. If the hover measurement is at or lower than the hover threshold, the object can be determined to be far away. If the hover measurement is higher than the hover threshold, the object can be determined to be close.

If the object is determined to be far away, the device can continue in hover mode, repeating a hover capacitance measurement (3910) and determining whether the object is still far away (3920) until the hover measurement exceeds the hover threshold, indicating that the object is touching or almost touching the device.

If however the object is determined to be close, the controller can switch to touch mode so that a touch sensing circuit of the device can measure a touch capacitance at the sensors (3930). In some embodiments, the controller can send a control signal to actuate a switch to couple with the touch sensing circuit. In some embodiments, the controller can send an enable signal to the touch sensing circuit and a disable signal to the hover sensing circuit.

A determination can be made whether an object is touching the device based on the touch measurement (3940). To perform the determination, the touch measurement can be compared to a threshold touch measurement. If the touch measurement is at or higher than the touch threshold, the object can be determined to be touching the device. If the touch measurement is lower than the touch threshold, the object can be determined not to be touching the device.

If the object is determined to be touching the device, the device can continue in touch mode, repeating a touch capacitance measurement (3930) and determining whether the object is still touching the device (3940) until the touch measurement falls below the touch threshold, indicating there is no longer a touch on the device.

If however the object is determined not to be touching the device, the measurement can be considered ambiguous since it is between the threshold hover measurement and the threshold touch measurement. As such, the device can switch between the two modes until such time that the measurement satisfies either of the thresholds. Accordingly, the controller can switch back to hover mode and the method can repeat (3910) through (3940).

It is to be understood that the method of FIG. 39 is not limited to that shown, but can include additional and/or other actions according to the needs of the device.

Figure 40:
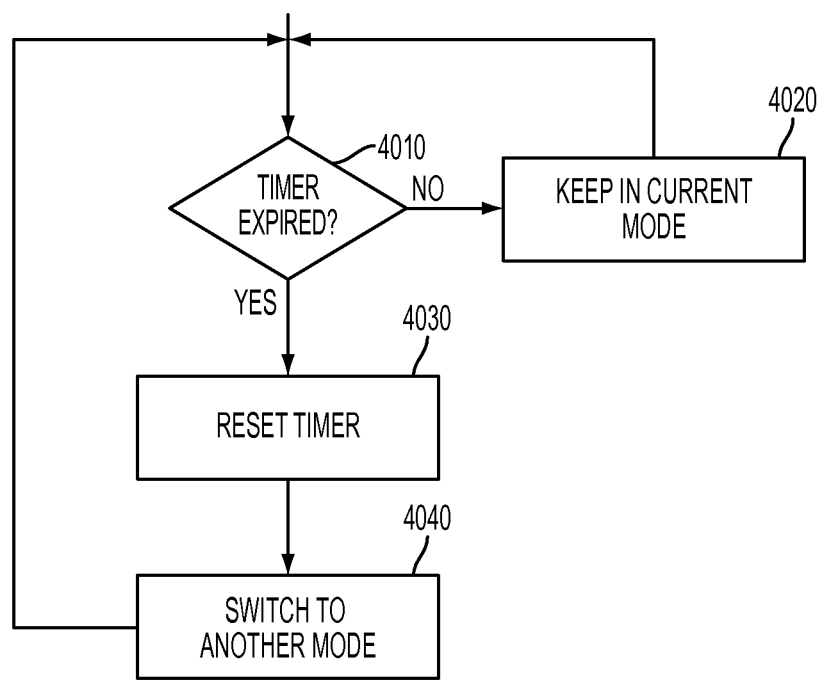
FIG. 40 illustrates another exemplary method to switch between touch and hover modes according to various embodiments.

FIG. 40 illustrates another exemplary method to switch between touch and hover modes of a touch and hover sensing device based on a timer according to various embodiments. This method can be implemented in software, firmware, or hardware according to the needs of the device either to cause a switch to couple a sensor to an appropriate sensing circuit based on the mode, as in FIGS. 35 through 37 or to enable or disable sensing circuits based on the mode, as in FIG. 38. In the example of FIG. 40, a controller of a touch and hover sensing device can determine whether a timer has expired (4010). If the timer has not expired, the device can continue in the current mode (4020). If in a touch mode, sensors of the device can be coupled to a touch sensing circuit. If in a hover mode, the sensors can be coupled to a hover sensing circuit.

If the timer has expired, the controller can reset the timer (4030). The controller can switch to another mode (4040). If the device was in the touch mode, the device can switch to the hover mode. In some embodiments, to perform the switching, the controller can send a control signal to actuate a switch to decouple from a touch sensing circuit and to couple to a hover sensing circuit. In other embodiments, to perform the switching, the controller can send an enable signal to the hover sensing circuit and a disable signal to the touch sensing circuit. If, however, the device was in the hover mode, the device can switch to the touch mode. In some embodiments, to perform the switching, the controller can send a control signal to actuate a switch to decouple from the hover sensing circuit and to couple to the touch sensing circuit. In other embodiments, to perform the switching, the controller can send an enable signal to the touch sensing circuit and a disable signal to the hover sensing circuit.

After switching to another mode, the controller can repeat the method (4010) through (4040), checking for expiration of the timer and, upon expiration, resetting the timer and switching to a different mode.

It is to be understood that the method of FIG. 40 is not limited to that shown, but can include additional and/or other actions according to the needs of the device.

In touch and hover switching, some or all of the sensors can be switched between the two modes. For example, in some embodiments, a portion of the sensors can be switched to hover mode to couple to the hover sensing circuit and a portion of the sensors can be switched to touch mode to couple to the touch sensing circuit. This can implement panel partitioning as described previously. In other embodiments, all of the sensor can be switched to the hover mode to couple to the hover sensing circuit or to the touch mode to couple to the touch sensing circuit.

Display Integration

In some embodiments, a touch and hover sensing device can integrate a display device with the touch and hover sensing panel, where the display can provide a graphical user interface with various graphics selectable via a touch or hover signal from the panel to cause the device to perform actions associated with the selected graphics. Because of its proximity to the panel, the display can interfere with the touch or hover signals generated by the panel to introduce noise, decrease touch or hover sensitivity, or otherwise adversely affect the signals. This can then cause unintended device action.

Figure 41:
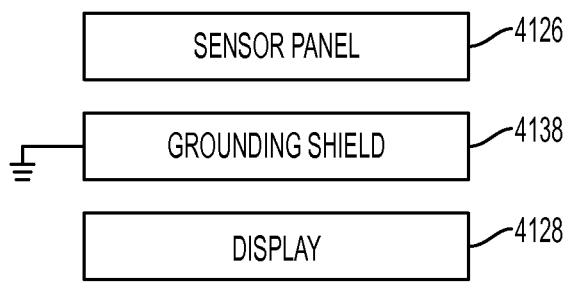
FIG. 41 illustrates an exemplary touch and hover sensing device having a grounding shield to minimize interference from the device display at the device touch and hover panel according to various embodiments.

FIG. 41 illustrates an exemplary touch and hover sensing device that can reduce interference between the device display and the device touch and hover sensing panel according to various embodiments. In the example of FIG. 41, grounding shield 4138 can be disposed between touch and hover sensing panel 4126 and display 4128. The grounding shield 4138 can help electrically isolate the panel 4126 from the display 4128 to reduce undesirable effects from the display to the panel.

Figure 42:
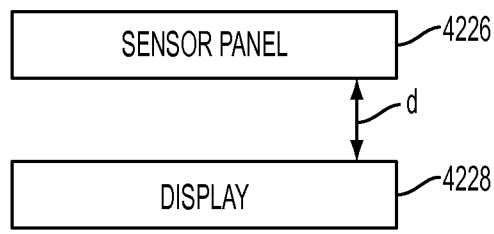
FIG. 42 illustrates an exemplary touch and hover sensing device that can minimize interference from the device display at the device touch and sensor panel by providing an optimal distance therebetween according to various embodiments.

FIG. 42 illustrates another exemplary touch and hover sensing device that can reduce interference between the device display and the device touch and hover sensing panel according to various embodiments. In the example of FIG. 42, touch and hover sensing panel 4226 and display 4228 can be spaced apart by optimal distance d. The optimal distance can be the distance at which effects from the display to the panel are substantially reduced or eliminated such that the touch and hover signals are minimally affected. In some embodiments, the optimal distance d=1 mm. Here, the optimal distance d can substantially reduce or eliminate the need for a grounding shield.

Exemplary Touch and Hover Sensing Devices

Figure 43:
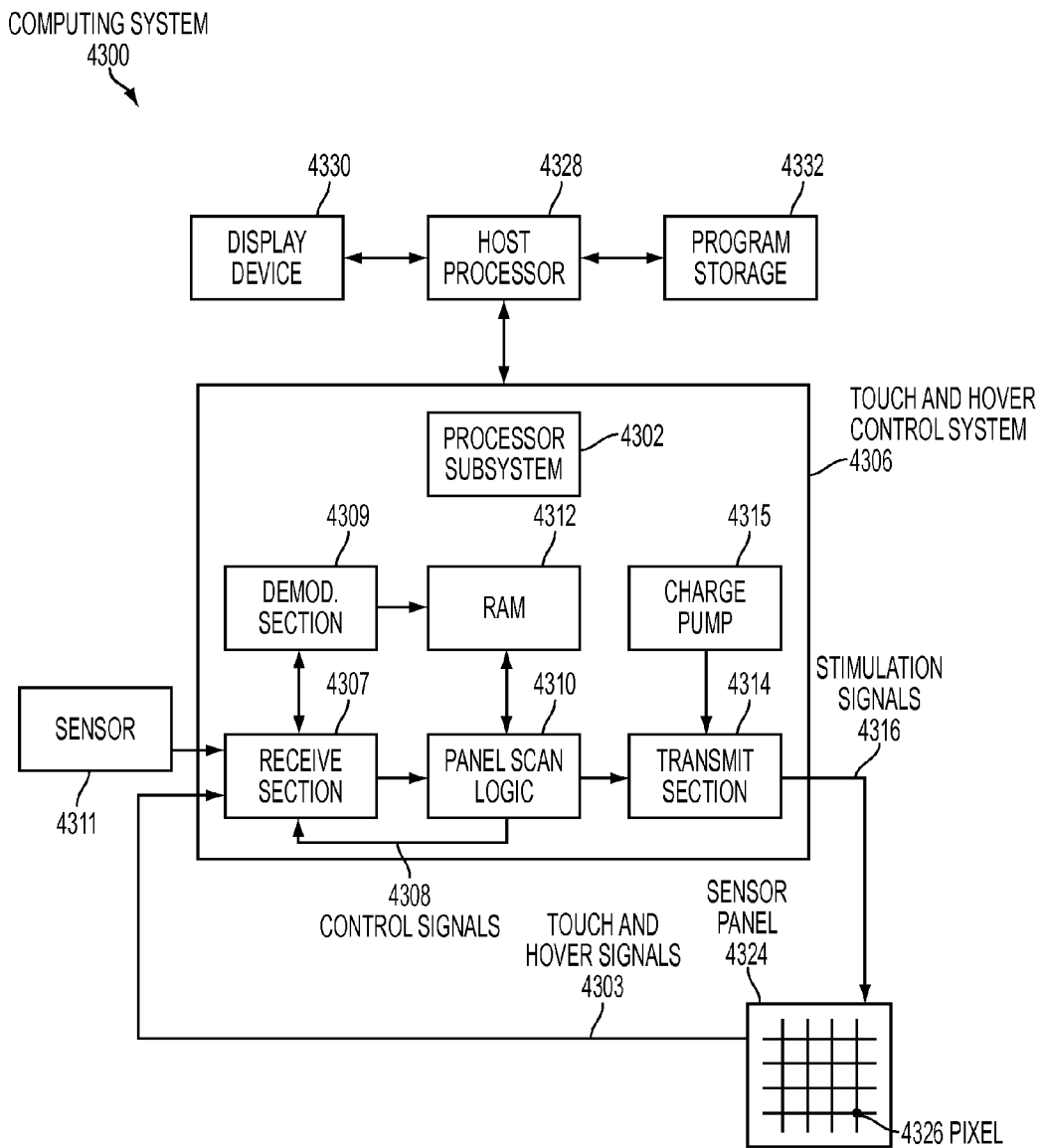
FIG. 43 illustrates an exemplary computing system that can perform touch and hover sensing according to various embodiments.

FIG. 43 illustrates an exemplary computing system 4300 that can have touch and hover sensing according to various embodiments described herein. In the example of FIG. 43, computing system 4300 can include touch and hover control system 4306. The touch and hover control system 4306 can be a single application specific integrated circuit (ASIC) that can include one or more processor subsystems 4302, which can include one or more main processors, such as ARM968 processors or other processors with similar functionality and capabilities. However, in other embodiments, the processor functionality can be implemented instead by dedicated logic, such as a state machine. The processor subsystems 4302 can also include peripherals (not shown) such as random access memory (RAM) or other types of memory or storage, watchdog timers and the like. The touch and hover control system 4306 can also include receive section 4307 for receiving signals, such as touch and hover signals 4303 of one or more sense channels (not shown), other signals from other sensors such as sensor 4311, etc. The receive section 4307 can include a touch sensing circuit, a hover sensing circuit, and a switching mechanism to switch between the sensing circuits according to the received touch and hover signals 4303. The touch and hover control system 4306 can also include demodulation section 4309 such as a multistage vector demodulation engine, panel scan logic 4310, and transmit section 4314 for transmitting stimulation signals 4316 to touch and hover sensor panel 4324 to drive the panel. The panel scan logic 4310 can access RAM 4312, autonomously read data from the sense channels, and provide control for the sense channels. In addition, the panel scan logic 4310 can control the transmit section 4314 to generate the stimulation signals 4316 at various frequencies and phases that can be selectively applied to horizontal lines and/or vertical lines of the sensor panel 4324.

The touch and hover control system 4306 can also include charge pump 4315, which can be used to generate the supply voltage for the transmit section 4314. The stimulation signals 4316 can have amplitudes higher than the maximum voltage by cascading two charge store devices, e.g., capacitors, together to form the charge pump 4315. Therefore, the stimulus voltage can be higher (e.g., 43V) than the voltage level a single capacitor can handle (e.g., 3.6 V). Although FIG. 43 shows the charge pump 4315 separate from the transmit section 4314, the charge pump can be part of the transmit section.

Touch and hover sensor panel 4324 can include a capacitive sensing medium having sensors for detecting a touch event or a hover event at the panel. The sensors can be formed from a transparent conductive medium such as indium tin oxide (ITO) or antimony tin oxide (ATO), although other transparent and non-transparent materials such as copper can also be used. Each sensor can represent a capacitive sensing node and can be viewed as picture element (pixel) 4326, which can be particularly useful when the sensor panel 4324 is viewed as capturing an "image" of touch or hover. (In other words, after the touch and hover control system 4306 has determined whether a touch event or a hover event has been detected at each sensor in the sensor panel, the pattern of sensors in the panel at which a touch event or a hover event occurred can be viewed as an "image" of touch or hover (e.g. a pattern of an object touching or hovering over the panel).)

Computing system 4300 can also include host processor 4328 for receiving outputs from the processor subsystems 4302 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. The host processor 4328 can also perform additional functions that may not be related to panel processing, and can be coupled to program storage 4332 and display device 4330 such as an LCD display for providing a UI to a user of the device. In some embodiments, the host processor 4328 can be a separate component from the touch and hover control system 4306, as shown. In other embodiments, the host processor 4328 can be included as part of the touch and hover control system 4306. In still other embodiments, the functions of the host processor 4328 can be performed by the processor subsystem 4302 and/or distributed among other components of the touch and hover control system 4306. The display device 4330 together with the touch and hover sensor panel 4324, when located partially or entirely under the sensor panel or when integrated with the sensor panel, can form a touch sensitive device such as a touch screen.

Note that one or more of the functions described above can be performed, for example, by firmware stored in memory (e.g., one of the peripherals) and executed by the processor subsystem 4302, or stored in the program storage 4332 and executed by the host processor 4328. The firmware can also be stored and/or transported within any computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer readable storage medium" can be any medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 44:
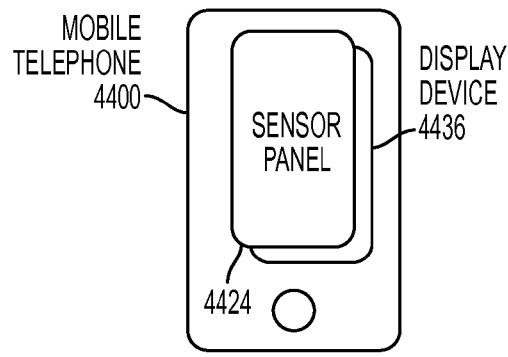
FIG. 44 illustrates an exemplary mobile telephone that can perform touch and hover sensing according to various embodiments.

FIG. 44 illustrates an exemplary mobile telephone 4400 that can include a display 4436 and a touch and hover sensor panel 4424 according to various embodiments.

Figure 45:
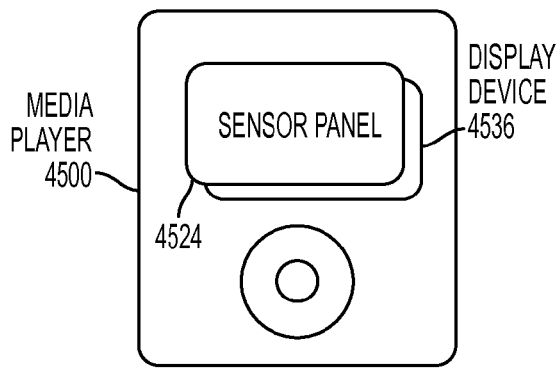
FIG. 45 illustrates an exemplary digital media player that can perform touch and hover sensing according to various embodiments.

FIG. 45 illustrates an exemplary digital media player 4500 that can include a display 4536 and a touch and hover sensor panel 4524 according to various embodiments.

Figure 46:
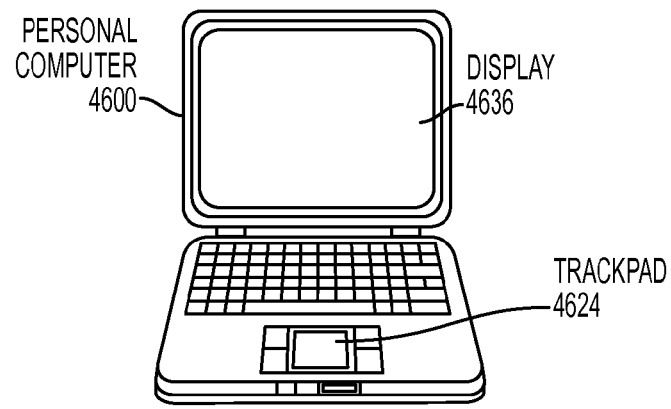
FIG. 46 illustrates an exemplary computer that can perform touch and hover sensing according to various embodiments.

FIG. 46 illustrates an exemplary personal computer 4600 that can include a touch and hover sensitive display 4636 and a touch and hover sensor panel (trackpad) 4624 according to various embodiments.

The mobile telephone, media player, and personal computer of FIGS. 44 through 46 can advantageously provide improved touch and hover sensing according to various embodiments.

In the examples above, a capacitance measurement can be a measure of a capacitance at a particular time, i.e., an absolute capacitance, or a measure of a capacitance difference over a particular time period, i.e., a change in capacitance. Accordingly, in some embodiments, touch events or hover events can be detected by a measurement of absolute capacitance at sensing lines of a touch and hover sensing device. In other embodiments, touch events or hover events can be detected by a measurement of a change in capacitance at sensing lines of a touch and hover sensing device. In still other embodiments, touch events or hover events can be detected by a combination of measurements of absolute capacitance and a change in capacitance at sensing lines of a touch and hover sensing device. The particular measurement can be determined according to the particular function, e.g., signal compensation, signal detection, etc., being performed by the device.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A method of compensating for sensors a sensing panel, the method comprising:
measuring capacitance at the touch sensor panel in a self-capacitance mode,
determining a location of an object based on the self-capacitance measurement in the self-capacitance mode;
adjusting the self-capacitance measurement based on the determined object location so as to compensate for location-based sensitivity variation in the sensing panel in the self-capacitance mode;
measuring capacitance at the touch sensor panel in a mutual capacitance mode;
determining a location of the object based on the mutual capacitance measurement in the mutual capacitance mode; and
adjusting the self-capacitance measurement based on the determined object location so as to compensate for location-based sensitivity variation in the sensing panel in the mutual capacitance mode, wherein adjusting the measurement comprises applying a first gain factor to the measurement in the self-capacitance mode, and applying a second gain factor to the measurement in the mutual capacitance mode, different from the first gain factor.

2. The method of claim 1, wherein the gain factor is a function of a minimum capacitance determined at an edge sensor location and a maximum capacitance determined at a center sensor location.

3. The method of claim 2, wherein the gain factor varies based on sensor location.

4. The method of claim 1, wherein the sensing panel sensitivity is at a minimum at edge sensor locations, at a maximum at center sensor locations, and increases therebetween from the edge sensor locations to the center sensor locations.

5. The method of claim 1, wherein adjusting the measurement comprises providing a substantially uniform sensitivity across the sensing panel.

6. The method of claim 1, wherein the gain factor is a function of sensor location.

7. A touch and hover sensing device comprising:
a sensing panel having multiple sensors at locations of the panel; and
a touch and hover control system configured to compensate for a sensitivity variation of the touch and hover sensing device by:
measuring a capacitance at the touch sensor panel in a self-capacitance mode, the capacitance being indicative of a proximate object,
determining a location of the proximate object based on the measured self-capacitance at the sensors,
adjusting the self capacitance measurements from the sensors according to a proximate object location in the self-capacitance mode;
measuring capacitance at the touch sensor panel in a mutual capacitance mode;
determining a location of the object based on the mutual capacitance measurement in the mutual capacitance mode; and
adjusting the mutual capacitance measurement based on the determined object location so as to compensate for location-based sensitivity variation in the sensing panel in the mutual capacitance mode, wherein adjusting the measurements comprises applying a first gain factor to the measurements in the self-capacitance mode, and applying a second gain factor to the measurement in the mutual capacitance mode, different from the first gain factor.

8. The device of claim 7, wherein the gain factor is a function of sensor location.

9. The device of claim 7, wherein the control system adjusts the capacitance measurements according to the sensor locations relative to a center sensor location.

10. The device of claim 7, wherein the proximate object is a hovering object.

11. The device of claim 7, wherein the gain factor is a function of a minimum capacitance determined at an edge sensor location and a maximum capacitance determined at a center sensor location.

12. The device of claim 7, wherein the touch and hover sensing device sensitivity is at a minimum at edge sensor locations, at a maximum at center sensor locations, and increases therebetween from the edge sensor locations to the center sensor locations.

13. The device of claim 7, wherein adjusting the capacitance measurements comprises providing a substantially uniform sensitivity across the touch and hover sensing device.

14. A touch and hover sensing device comprising:
a touch and hover sensing panel having multiple sensors configured to detect one or more objects proximate to the panel, wherein the objects touch the panel to cause a touch event, hover over the panel to cause a hover event, or touch and hover concurrently to cause touch and hover events; and
a touch and hover control system configured to:
measure capacitance associated with the proximate objects in a self-capacitance mode,
determine a location of the one or more proximate objects to the panel based on the self capacitance measurement in the self-capacitance mode,
adjust the self-capacitance measurement based on the location of the one or more proximate objects so as to compensate for sensitivity variation in the self-capacitance mode;
measure capacitance associated with the proximate objects in a mutual capacitance mode;
determine a location of the one or more proximate objects based on the mutual capacitance measurement in the mutual capacitance mode; and
adjust the mutual capacitance measurement based on the determined object location so as to compensate for location-based sensitivity variation in the sensing panel in the mutual capacitance mode, wherein adjusting the capacitance measurement comprises applying a first gain factor to the measurement in the self-capacitance mode, and applying a second gain factor to the measurement in the mutual capacitance mode, different from the first gain factor.

15. The device of claim 14, wherein the control system is configured to increase the capacitance measurement as a function of sensor location so as to compensate for the touch and hover sensing device sensitivity variation.

16. The device of claim 14, wherein the gain factor is a function of a minimum capacitance determined at an edge sensor location and a maximum capacitance determined at a center sensor location.

17. The device of claim 14, wherein the gain factor is a function of sensor location.

18. The device of claim 14, wherein adjusting the measurement comprises providing a substantially uniform sensitivity across the touch and hover sensing device.

19. The device of claim 14, wherein the touch and hover sensing device sensitivity is at a minimum at edge sensor locations, at a maximum at center sensor locations, and increases therebetween from the edge sensor locations to the center sensor locations.

20. The device of claim 14, further comprising a display configured to display graphical information to select in response to the touch and hover events.

21. The device of claim 14 incorporated into at least one of a mobile phone, a digital media player, or a computer.

* * * * *